US012717288B2

(12) United States Patent
Axtolis et al.

(10) Patent No.: US 12,717,288 B2
(45) Date of Patent: Aug. 25, 2026

(54) SYSTEM AND METHOD FOR PROGRAMMING A TRAINABLE TRANSMITTER

(71) Applicant: The Chamberlain Group LLC, Oak Brook, IL (US)

(72) Inventors: Robert Jude Axtolis, Naperville, IL (US); James Joseph Fitzgibbon, Batavia, IL (US); David R. Morris, Glenview, IL (US)

(73) Assignee: The Chamberlain Group LLC, Oak Brook, IL (US)

( * ) Notice: Subject to any disclaimer, the term of this patent is extended or adjusted under 35 U.S.C. 154(b) by 466 days.

(21) Appl. No.: 18/365,879

(22) Filed: Aug. 4, 2023

(65) Prior Publication Data

US 2024/0036529 A1 Feb. 1, 2024

Related U.S. Application Data

(63) Continuation of application No. PCT/US2023/071290, filed on Jul. 28, 2023.

(Continued)

(51) Int. Cl.
*G05B 13/02* (2006.01)
*E05F 15/77* (2015.01)

(52) U.S. Cl.
CPC .......... *G05B 13/0265* (2013.01); *E05F 15/77* (2015.01); *E05Y 2400/85* (2013.01);

(Continued)

(58) Field of Classification Search
CPC ....... E05Y 2400/8515; E05Y 2400/851; E05Y 2400/85; E05Y 2900/106; G05B 13/0265

(Continued)

(56) References Cited

U.S. PATENT DOCUMENTS

2003/0033540 A1 2/2003 Fitzgibbon
2015/0228135 A1* 8/2015 Tehranchi ................ G07C 9/28 340/5.61

(Continued)

OTHER PUBLICATIONS

Hager et al., "Physics-Based deep learning for fiber-optic communication systems", IEEE Journal on selected areas in communications, vol. 39, No. 1, Jan. 2021 (Year: 2021).*

(Continued)

*Primary Examiner* — Tsu-Chang Lee
(74) *Attorney, Agent, or Firm* — Foley IP Law, PLLC

(57) ABSTRACT

In one aspect, a method for using a remote control to train a trainable transmitter is provided. The method includes receiving a user input at a user interface of the remote control, broadcasting to a controllable device a first radio frequency communication via a first security protocol in response to receiving the user input at the user interface, the first communication including a first fixed code and a first changing code. The method further includes measuring a duration of the user input and broadcasting to the controllable device and the trainable transmitter a second radio frequency communication via a second security protocol different than the first security protocol in response to the measured duration of the user input satisfying a user input duration condition, the second radio frequency communication including the first fixed code and the first changing code.

20 Claims, 20 Drawing Sheets

Related U.S. Application Data

(60) Provisional application No. 63/393,085, filed on Jul. 28, 2022.

(52) U.S. Cl.
CPC . *E05Y 2400/851* (2024.05); *E05Y 2400/8515* (2024.05); *E05Y 2900/106* (2013.01)

(58) Field of Classification Search
USPC ............................................................ 706/12
See application file for complete search history.

(56) References Cited

U.S. PATENT DOCUMENTS

| | | | | |
|---|---|---|---|---|
| 2015/0302738 | A1 | 10/2015 | Geerlings | |
| 2019/0244448 | A1 * | 8/2019 | Alamin | G07C 9/00896 |
| 2021/0358239 | A1 | 11/2021 | Key et al. | |
| 2024/0005713 | A1 * | 1/2024 | Axtolis | H04W 12/50 |

OTHER PUBLICATIONS

McClintick et al., "Self-Organizing multilateration of an unknown number of transmitters", IEEE Journal of vehicular technology, vol. 3, 2022 (Year: 2022).*
International Search Report and Written Opinion of the ISA/EP, mailed Nov. 7, 2023, in PCT Application No. PCT/US2023/071290, 11 pages.
EPO; Communication pursuant to Rules 161(1) and 162 EPC; dated Mar. 7, 2025; in EP Application No. 23758173.1; 3 pages.
First Office Action for Chinese Application No. 2023800574639, mailed on Jun. 6, 2026, 35 Pages (English Translation Provided).

* cited by examiner

SYSTEM AND METHOD FOR PROGRAMMING A TRAINABLE TRANSMITTER

CROSS-REFERENCE TO RELATED APPLICATION

This application is a continuation of and claims priority to PCT Application No. PCT/US23/71290, filed Jul. 28, 2023, which claims the benefit of U.S. Provisional Application No. 63/393,085, filed Jul. 28, 2022, the entirety of which is hereby incorporated by reference herein.

FIELD

This disclosure generally relates to radio frequency transmitters and, more specifically, to programming trainable transmitters to operate controllable devices.

BACKGROUND

A movable barrier operator system usually includes a movable barrier operator, such as a garage door operator, and a remote control, such as a transmitter. The transmitter transmits a radio frequency (RF) signal including an access code that is received by the movable barrier operator. If the movable barrier operator authenticates the access code, the movable barrier operator performs the requested action such as changing the state (e.g., open/closed) of a movable barrier.

Access codes may include changing codes, such as rolling codes, that change with each operation of the transmitter. The transmitter and the movable barrier operator both use a similar algorithm to calculate the next access code to be sent and received.

One type of access code includes four codes, such as a fixed (i.e., non-changing) transmitter number identification or code, a rolling code, a fixed transmitter type identification code, and a fixed switch identification code. The fixed transmitter identification code is a substantially unique transmitter identification number for the transmitter such as a universally unique identification (UUID) or globally unique identifier (GUID). The rolling code is a code that changes every transmission to increase security by preventing the transmission from being intercepted, recorded, and replayed. The type identification code of the access code is used to notify the movable barrier operator of the type and features of the transmitter. The switch identification code is used to identify which switch on the transmitter (e.g. if the transmitter is configured with more than one switch/button) is being pressed.

In the garage door operator context, a user typically receives at least one remote control, e.g., a trained transmitter, when the garage door opener is purchased and/or installed. The trained transmitter was previously learned by the garage door opener, so that the user may press a button of the transmitter to cause the transmitter to transmit RF signal including an access code to the garage door opener and open the garage door.

"Trainable" transmitters, also known as "universal" transmitters, are configured to be learned by a garage door opener as a replacement for, or in addition to, the trained transmitters. Trainable transmitters include in-vehicle trainable transmitters such as those integrated in the dashboard, visor, or rearview mirror of the vehicle. One such trainable transmitter is a HomeLink® device or system.

Various approaches are currently used to train a garage door operator to respond to a RF signal from a trainable transmitter of a vehicle. In one approach, the user places the vehicle trainable transmitter into a mode to listen for a RF signal from a trained transmitter. The user presses a button of the trained transmitter within range of both the vehicle trainable transmitter and the garage door operator. The garage door operator receives the RF signal from the trained transmitter, decrypts and parses the access code of the RF signal and opens the garage door. Upon receiving the RF signal from the trained transmitter, the garage door opener starts a time window to initiate a training process.

The vehicle trainable transmitter also decrypts and parses the RF signal from the trained transmitter. The vehicle trainable transmitter adapts or derives a unique transmitter identifier, a rolling code, and a payload from the transmitter identifier, rolling code, and payload of the RF signal from the trained transmitter. For example, the vehicle trainable transmitter may prepend or append a value to the transmitter identifier of the trained transmitter.

Next, the user presses a button of the vehicle trainable transmitter within the time window set by the garage door operator, and the vehicle trainable transmitter transmits a RF signal including the derived transmitter identifier, a derived rolling code (e.g. a next or subsequent rolling code to the rolling code that was transmitted by the trained transmitter), and a derived payload.

Upon the garage door operator receiving the RF signal from the vehicle trainable transmitter within the time window, the garage door operator determines whether the derived transmitter identifier, rolling code, and payload correspond to the trained transmitter that last caused the garage door opener to move the garage door.

Some prior security systems for movable barrier operators utilize a unidirectional communication of the access code from the trained or learned transmitter to the movable barrier operator. The movable barrier operator authenticates the access code received from the transmitter and changes the state of the movable barrier if the access code has been learned by the movable barrier operator.

Some newer security systems utilize a bidirectional security protocol such as disclosed in U.S. Pat. No. 10,652,743. In one approach, the bidirectional security protocol generally involves a transmitter communicating a first signal to the movable barrier operator, the movable barrier operator sending a second signal to the transmitter in response to the first signal, and the transmitter sending a third signal to the movable barrier operator in response to the second signal. The predetermined pattern or back-and-forth of communication signals between the transmitter and the movable barrier and changing codes of the signals provides an additional layer of security against "man-in-the middle" attacks.

A customer may purchase a newer garage door opener that includes a different communication protocol, such as a bidirectional security protocol, but already owns a vehicle with a trainable transmitter. The vehicle trainable transmitter of the customer may not be compatible with bidirectional communication security protocol. In this situation, the user may be unable to operate the newer garage door opener using the trainable transmitter in the customer's vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems and methods for training a trainable transmitter are provided. The method includes sending, from a remote control previously learned using a first security protocol learn mode, a first radio frequency communication via a first security protocol, the first radio frequency communication including a first fixed code and a first changing code; authenticating, by a controllable device, the remote control based at least in part upon the first fixed code, the first changing code, and a changing code of a previous radio frequency communication from the remote control; entering, by the controllable device, a second security protocol learn mode in response to authenticating the remote control; while the controllable device is in the second security protocol learn mode: sending, from the remote control, a second radio frequency communication via a second security protocol different than the first security protocol, the second radio frequency communication including the first fixed code and the first changing code; receiving, by the trainable transmitter, the second radio frequency communication; determining, by the trainable transmitter, at least one of a second fixed code and a second changing code based at least in part upon the first fixed code and the first changing code; sending, from the trainable transmitter, a third radio frequency communication via the second security protocol, the third radio frequency communication including the at least one of the second fixed code and the second changing code; and learning, by the controllable device, the trainable transmitter in response to the second fixed code corresponding to the first fixed code and the second changing code corresponding to the first changing code.

DETAILED DESCRIPTION

Figure 1:
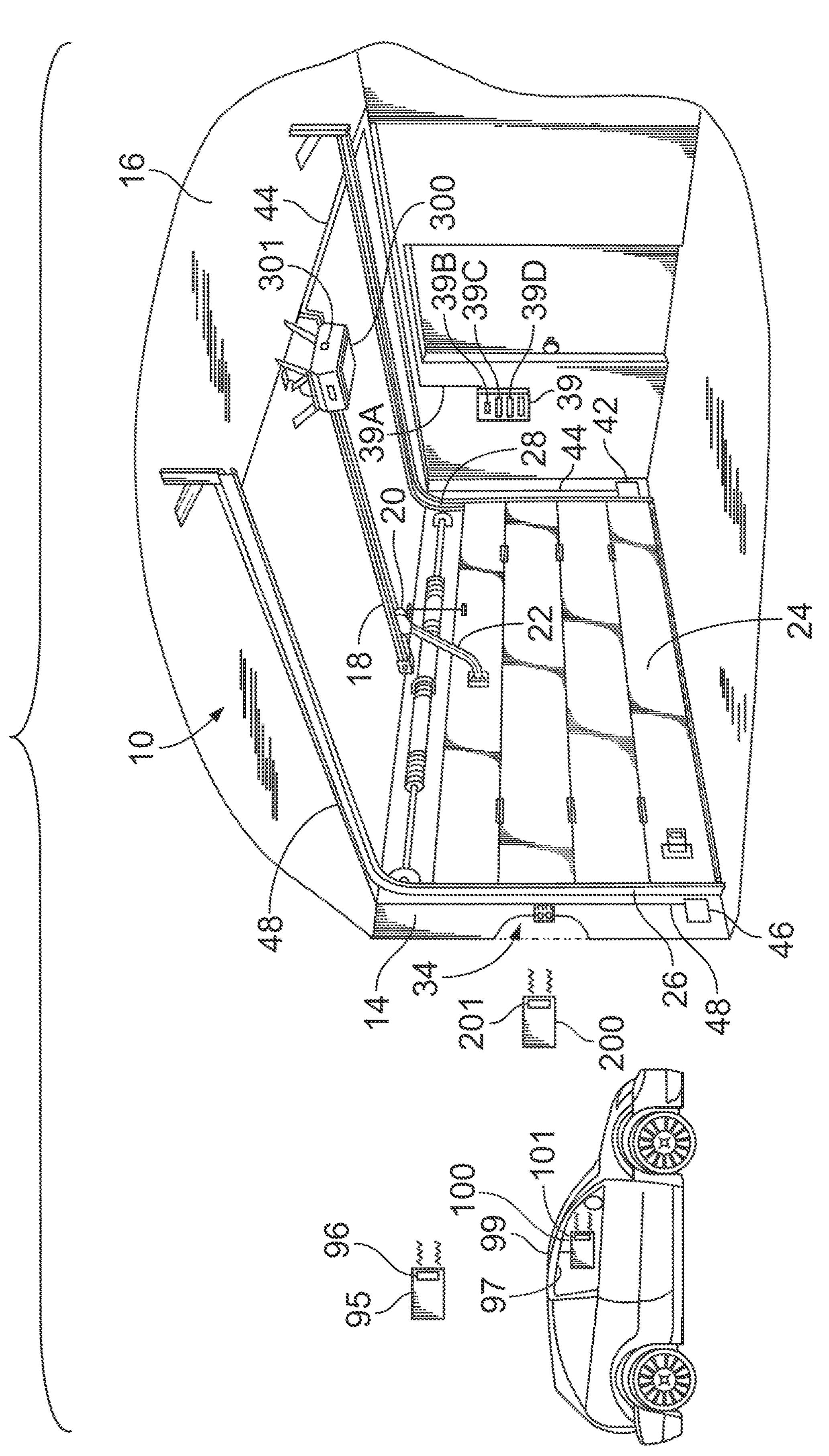
FIG. 1 is a perspective view of a movable barrier operator, a previously learned transmitter, and a trainable transmitter of a vehicle.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

In one aspect of the present disclosure, a system is provided that includes a controllable device such as a movable barrier operator, a previously learned remote control for the controllable device, and a trainable transmitter. The controllable device and the previously learned remote control are configured to communicate using a first communication protocol. The first communication protocol may include using a first radio frequency and a first security protocol. A security protocol may include, for example, encryption/decryption techniques and/or a predetermined pattern of exchanging messages that are used to authenticate communications between devices. The first communication protocol may include, for example, a Bluetooth® Low Energy protocol that utilizes a security protocol including a bidirectional exchange of fixed and rolling codes as described hereinafter with reference to FIGS. 8A and 8B.

The trainable transmitter may include a trainable transmitter integrated in the interior of the vehicle, such as in a dashboard, a visor, or in a rearview mirror of the vehicle. The trainable transmitter is operable to communicate via a second communication protocol that may include a second radio frequency and a second security protocol. The second security protocol is different than the first security protocol, while the second radio frequency may be the same or different than the first radio frequency. The trainable transmitter may be a HomeLink® style universal transmitter capable of learning radio frequency signals transmitted by transmitters made by different manufacturers and having different code formats, frequencies, transmitter IDs, bit patterns, etc. Although the trainable transmitter is capable of being programmed using transmitters that utilize various communication protocols, the trainable transmitter is unable to communicate via the first communication protocol native to the remote control and the controllable device.

To program the trainable transmitter to operate the controllable device, the remote control is configured to operate as a facilitator or intermediary by broadcasting an access code to the controllable device via the first communication protocol and broadcasting the access code to the trainable transmitter via a second communication protocol. For example, a user causes the trainable transmitter to enter a learning mode such as by pressing and holding a button of the trainable transmitter the user wants to program to operate the controllable device. While the user continues to hold down the button of the trainable transmitter, the user presses and holds a button of the remote control which causes the remote control to transmit to the controllable device the access code via the first communication protocol.

The controllable device receives the communication from the remote control via the first communication protocol. The controllable device authenticates the communication from the remote control and automatically enters a second communication protocol learn mode, which is a particular mode of the controllable device distinct and different from an operating mode, for learning devices that are configured (or otherwise constrained) to use the second communication protocol rather than the first communication protocol. In the second communication protocol learn mode, the controllable device calculates a derived access code from the access code. The derived access code has a mathematical relationship to the access code received via the first communication protocol. For example, the derived access code may include the access code with a value prepended or appended thereto, an incremented version of the access code, and/or a version of the access code modified according to a mathematical equation. The controllable device may remain in the second communication protocol learn mode for a predetermined period of time, such as 45 seconds. As part of entering the second communication protocol learn mode, the controllable device derives an access code from the access code transmitted by the remote control.

When the controllable device is in the second communication protocol learn mode, the controllable device will learn a transmitter that transmits via the second communication protocol the derived access code that was also derived by the controllable device from the access code broadcasted by the remote control. The controllable device and the trainable transmitter use similar algorithms to determine the derived access code.

The remote control may transmit a signal using the second communication protocol in response to satisfaction of a user input condition. For example, the remote control monitors how long the user is holding down the button of the remote control. Once the user has held down the button for a predetermined duration or period of time, such as fifteen seconds, the remote control broadcasts a signal with the access code to the trainable transmitter using the second communication protocol.

The trainable transmitter is able to receive the access code from the remote control since the access code is transmitted using the second communication protocol. The trainable transmitter determines the derived access code from the access code of the remote control. For example, the trainable transmitter may derive a second fixed code from a first fixed code of the access code and may derive a second changing code from a first changing code of the access code.

The trainable transmitter stores the derived access code in a memory of the trainable transmitter and the trainable transmitter blinks an LED or otherwise indicates to a user that the trainable transmitter has been programmed via the remote control. The user releases the buttons of the remote control and the trainable transmitter since the trainable transmitter has been programmed.

To cause the movable barrier operator to learn the trainable transmitter, the user presses the now-trained button of the trainable transmitter to cause the trainable transmitter to transmit a radio frequency communication including the derived access code to the controllable device via the second communication protocol. The movable barrier operator receives the radio frequency communication, determines the derived access code of the trainable transmitter corresponds to the access code from the remote control, and learns the trainable transmitter such as by storing a fixed code and a changing code of the trainable transmitter in a transmitter whitelist of the movable barrier operator. The movable barrier operator may, for example, determine the access code of the trainable transmitter corresponds to the access code of the remote control in response to the movable barrier operator determining that the access code of the trainable transmitter has the same (or similar) mathematical relationship to the access code of the remote control as does the derived access code the movable barrier operator calculated from the access code of the remote control.

In one embodiment, the controllable device may have a limit on the number of trainable transmitters that may utilize the second communication protocol to operate the controllable device. For example, the controllable device may include a movable barrier operator that will learn two trainable transmitters utilizing the second communication protocol. If the user attempts to program a third trainable transmitter to operate the movable barrier operator, the movable barrier operator will remove the first trainable transmitter from a transmitter whitelist of the movable barrier operator and will add the third trainable transmitter in a first-in, first-out manner.

The present disclosure provides an architecture that provides an ability for transmitters that cannot communicate using a first communication protocol to be trained and then operate a movable barrier operator that communicates using both the first communication protocol and the second communication protocol. The architecture provided herein addresses inherently technical problems posed by devices that cannot communicate using the first communication protocol, and enables these devices to be learned by and operate other devices that historically have been controlled/operated using the first communication protocol. First, enabling a movable barrier operator that is currently communicating using the first communication protocol to switch to a second communication protocol learn mode requires a triggering event from a remote control that is currently controlling the movable barrier operator using the first communication protocol. As such, the trainable transmitter cannot simply request to be learned by the movable barrier operator by itself. Rather, the movable barrier operator needs to be placed in a second security protocol learn mode before the movable barrier operator has the ability to learn the trainable transmitter; however, the movable barrier operator cannot enter the second communication protocol learn mode without communicating with the remote control (e.g., that is currently controlling the movable barrier operator using the first communication protocol).

The system/architecture described herein provides a technical solution to these inherently technical problems by enabling a user to initiate the learning of the trainable transmitter by the movable barrier operator by providing input to both the remote control and the trainable transmitter. The input provided to each of the remote control and the trainable transmitter initiates the process by causing the trainable transmitter to operate in a learn mode as well as causing the remote control to provide the movable barrier operator with a set of communications that cause the movable barrier operator to enter into a second communication protocol learn mode, enabling the movable barrier operator to communicate with the trainable transmitter using the second communication protocol, and ultimately learn the trainable transmitter based on these communications that would otherwise not be possible.

With reference to FIG. 1, a controllable device system 10 is provided that includes a controllable device such as a movable barrier operator 300 installed in a garage 14. The movable barrier operator 300 is mounted to a ceiling 16 of the garage 14 and includes a rail 18 with a trolley 20 movable there along. The trolley 20 has an arm 22 connected to a movable barrier such as a garage door 24 positioned for movement along a pair of door tracks 26 and 28. The movable barrier operator 300 is shown as a trolley-type garage door operator, but other types of movable barrier operators such as gate operators, commercial door operators, and jackshaft operators may be utilized.

The controllable device system 10 includes a remote control 200 that has previously been learned by the movable barrier operator 300. For example, the remote control 200 may be sold with the movable barrier operator 300 or may have been previously programmed to control the movable barrier operator 300. The remote control 200 includes a user interface 201, such as one or more buttons, a touchscreen, and/or a microphone. Upon the user interface 201 receiving a user input, such as a button press, the remote control 200 communicates one or more signals to the movable barrier operator 300. The controllable device system 10 also includes a trainable transmitter 100 that has not yet been learned by the movable barrier operator 300. The trainable transmitter 100 includes a user interface 101, such as one or more buttons, a touchscreen, and/or a microphone.

According to one embodiment, the trainable transmitter 100 is integrated in an interior portion 97 of a vehicle 99 (e.g., an automobile). The interior portion 97 may include, for example, a dashboard, a rearview mirror, a center console, a sunvisor, or a headliner as some examples. An example of the trainable transmitter 100 is a HomeLink® transmitter which is integral or unitary with the vehicle. In other embodiments, the trainable transmitter 100 may be a handheld transmitter, such as a handheld trainable transmitter 95 having a user interface 96. The handheld transmitter 95 may clip to a visor of the vehicle 99, may be attachable/detachable such as the ARQ™ universal transmitter from Chamberlain Group, or may be a keyfob as some examples.

The controllable device system 10 may include one or more remote controls in addition to remote control 200, such as an exterior keypad 34, a wall control 39, and/or a user device such as a smartphone, smartwatch, or tablet computer. The keypad 34 is positioned on an exterior of the garage 14, has one or more buttons thereon, and is operable to control the movable barrier operator 300. The wall control 39 is mounted on a wall in the interior of the garage 14 and may be coupled to the movable barrier operator 300 via a wired connection 39A or wirelessly. The wall control 39 includes a light switch 39B, a lock switch 39C and a command switch 39D. The system 10 includes a safety system such as an optical emitter 42 and detector 46 connected to the movable barrier operator 300 via wires 44, 48.

Figure 2:
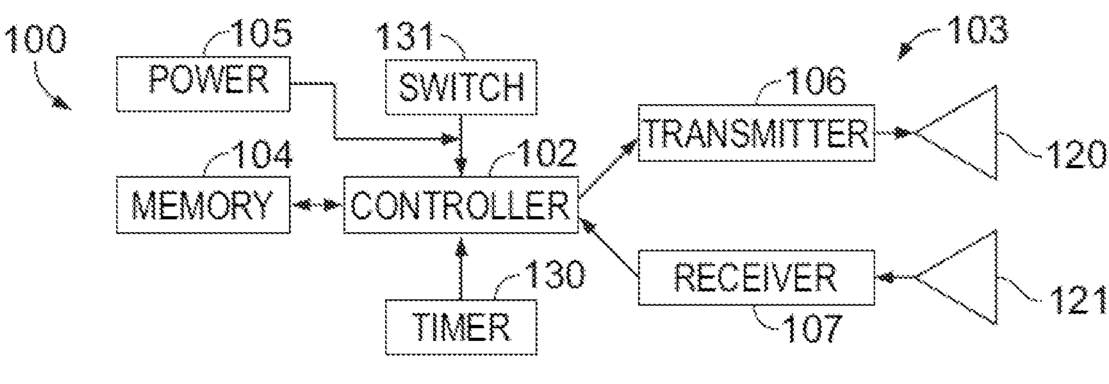
FIG. 2 is a block diagram of the trainable transmitter of FIG. 1.

Referring now to FIG. 2, a block diagram of the trainable transmitter 100 is provided. The trainable transmitter 100 includes communication circuitry 103 having a transmitter 106 and receiver 107 in operative communication with antennas 120 and 121, respectively. The transmitter 106 and the receiver 107 are shown as distinct components, although they may be provided as a single transceiver.

The transmitter 106 and receiver 107 are configured for wirelessly sending (e.g., transmitting or broadcasting) and receiving radio frequency communications to and from the remote control 200 and the movable barrier operator 300 using a second communication protocol. The second communication protocol may encompass, for example, using a particular radio frequency, frequencies, or frequency band(s) for communications and a particular security protocol or code format for encoding and decoding communications. An example of the second communication protocol includes a Security+2.0 security protocol and utilizing radio frequency communications at a frequency of 315 MHz.

The radio frequency communications transmitted by the transmitter 106 include a first fixed code such as a transmitter identifier ("ID") and a first changing code such as a rolling code. In some embodiments, the trainable transmitter 100 may also include other data in the radio frequency communications transmitted by the transmitter 106 such as transmitter type information and button ID information. The second communication protocol may be a legacy, unidirectional communication protocol commonly used by garage door operator manufacturers. For example, the second communication protocol may include the Security Plus and Security+2.0 security protocols utilized by various movable barrier operators sold by the Chamberlain Group.

The trainable transmitter 100 may be operable to be programmed to operate controllable devices sold by different manufacturers using radio frequency signals at different frequencies. For example, the transmitter 106 and the receiver 107 may be operable to communicate at a plurality of frequencies, such as frequencies less than 1 GHz including 300 MHz-400 MHz and 900 MHz radio frequency transmissions.

In some embodiments, the transmitter 106 and receiver 107 may each communicate using a single antenna or multiple antennas. In one embodiment, the trainable transmitter 100 has a transceiver with one or more antennas.

The trainable transmitter 100 also includes a controller 102 operatively connected to the transmitter 106 and the receiver 107. The controller 102 may include, for example, a central processing unit (CPU), an application specific integrated circuit (ASIC), a field programmable gate array (FPGA), programmable logic array (PLA), or state machine as some examples. The controller 102 is configured to operate the trainable transmitter 100, such as encrypting messages to be transmitted via the transmitter 106 and decrypting messages received via the receiver 107. The controller 102 may be configured to derive an access code, such as a fixed code and/or a changing code, from a radio frequency transmission received at the receiver 107 during training of the trainable transmitter 100. For example, the trainable transmitter 100 may include a HomeLink® transmitter and the controller 102 is operable to derive a fixed transmitter ID and a rolling code for the trainable transmitter 100 using a HomeLink®-associated algorithm. The trainable transmitter 100 further includes a memory 104 to store data, such as encryption algorithms, access codes, and transmitter identification information. The memory 104 may include, but is not limited to, RAM, ROM, EEPROM, or magnetic/optical storage.

The trainable transmitter 100 includes a power source 105, such as a battery and/or an in-vehicle power source such as a vehicle accessory power bus. In one embodiment, the user interface 101 includes a button that operates a switch 131. Pressing the button closes the switch 131 and permits the power source 105 to provide electrical power to controller 102. The controller 102 causes the transmitter 106 to transmit a radio frequency transmission in response to the controller 102 receiving the electrical power. In another embodiment, the controller 102 continuously receives power from the power source 105 during operation of the vehicle 99 and monitors for signals provided by the switch 131.

The user interface 101 of the trainable transmitter 100 may include two buttons and associated switches 131. In response to a user pressing and holding both buttons for a predetermined period of time, the controller 102 enters a training mode. The controller 102 may flash an LED of the user interface 101 to indicate the trainable transmitter 100 has entered the training mode. Next, the user presses a button the user wants to program and actuates a transmitter (i.e., previously learned by the movable barrier operator 300 which is desired to be controlled by the trainable transmitter 100) that is being used to train the trainable transmitter 100. The controller 102 operates the receiver 107 to listen for a radio frequency communication from the previously learned transmitter. The controller 102 decodes the received radio frequency communication, determines previously learned transmitter information from the communication such as a fixed code and a changing code, and derives transmitter information for the trainable transmitter 100 to use such as a second fixed code and a second changing code. The trainable transmitter 100 exits the training mode and associates the derived information with the button the user pressed after the trainable transmitter 100 entered the training mode. Upon the user pressing the now-programmed button, the controller 102 controls the transmitter 106 to transmit a radio frequency communication including the derived fixed code and the derived changing code. The trainable transmitter 100 receives the radio frequency communication from the previously learned transmitter and broadcasts control signals to the movable barrier operator 300 using the first communication protocol. Further details regarding the programming of the trainable transmitter 100 are discussed in greater detail below.

The trainable transmitter 100 includes a timer 130 in communication with, or a component of, the controller 102. The controller 102 may utilize the timer 130 to exit the training mode after a predetermined period of time. Various embodiments of the trainable transmitter 100 may be utilized. For example, the trainable transmitter 100 may be operated in response to the vehicle 99 entering/leaving a geofenced area. As another example, the user interface 101 may encompass a touchscreen of the vehicle 99 and the trainable transmitter 100 communicates a control signal in response to a user pressing a virtual button displayed on the touchscreen.

Figure 3:
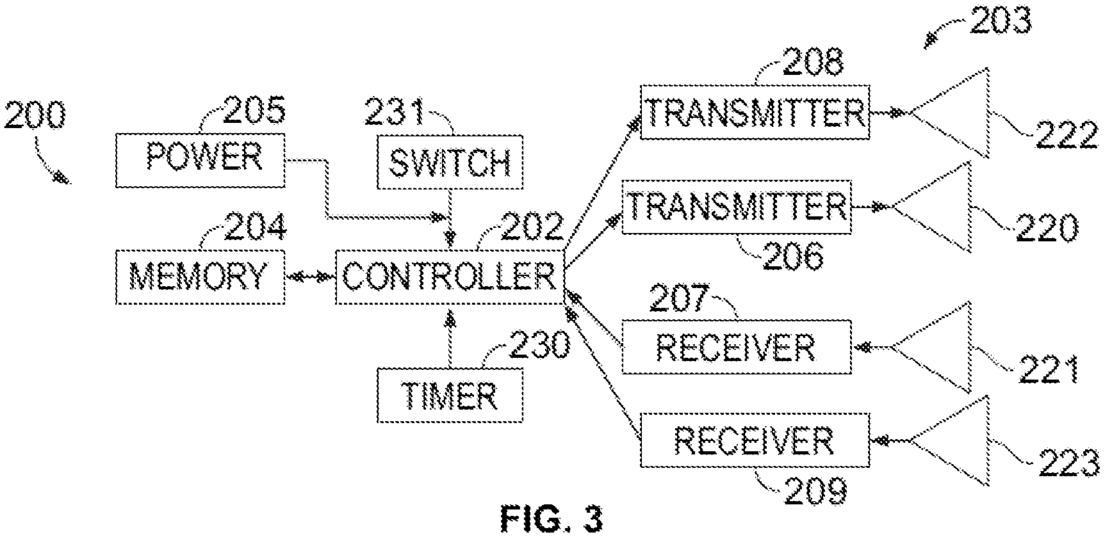
FIG. 3 is a block diagram of the remote control of FIG. 1.

Referring now to FIG. 3, a block diagram of the remote control 200 is provided. The remote control 200 includes communication circuitry 203 having a first transmitter 206 and a first receiver 207 in operative communication with antennas 220 and 221, respectively. The first transmitter 206 and first receiver 207 are shown as distinct components, although they may be provided as a transceiver.

The first transmitter 206 and first receiver 207 are configured for wirelessly broadcasting and receiving transmission signals to and from the movable barrier operator 300 using a first communication protocol. The first communication protocol may utilize one or more security protocols as disclosed in U.S. Pat. No. 10,652,743.

The first communication protocol may be a bidirectional protocol, whereas the second communication protocol utilized by the trainable transmitter 100 may be a legacy unidirectional protocol. For example, the second communication protocol may utilize a security protocol disclosed in U.S. Pat. No. 7,071,850, incorporated by reference herein in its entirety. The trainable transmitter 100 may be unable to communicate using the first communication protocol of the remote control 200 and the movable barrier operator 300. Thus, the trainable transmitter 100 may be unable to derive a fixed code, e.g. a transmitter ID, and a changing code, e.g. a rolling code, from a radio frequency communication transmitted using the first communication protocol.

The second communication protocol may include communicating using one or more frequencies, channels, bands, and/or radio physical layers or protocols including but not limited to, for example, 300 MHz-400 MHz, 900 MHz, 2.4 GHz, Bluetooth, and/or Bluetooth Low Energy (BLE).

The communication circuitry 203 of the remote control 200 includes a second transmitter 208 operatively connected to an antenna 222. The second transmitter 208 is configured to transmit radio frequency signals to the movable barrier operator 300 and the trainable transmitter 100 using the second communication protocol. The remote control 200 may include a second receiver 209 operatively connected to an antenna 223 and configured to receive signals via the second communication protocol. The second transmitter 208 and second receiver 209 are shown as distinct components, although they may be provided as a transceiver. In another embodiment, the remote control 200 may have a single transmitter operable to transmit using the first and second communication protocols and a single receiver operable to receive using the first and second communication protocols. In yet another embodiment, the transmitters and receivers of the remote control 200 may be provided as a single transceiver operable to transmit and receive communications via the first and second communication protocols.

In one embodiment, the remote control 200, and more specifically, the controller 202 has a plurality of modes of operation. For example, the controller 202 may have a learn mode wherein the controller 202 operates the first transmitter 206 and first receiver 207 to communicate with the movable barrier operator 300 and facilitate the movable barrier operator 300 learning the remote control 200, such as at the factory. The controller 202 may enter the learn mode in response to the remote control 200 broadcasting a message to the movable barrier operator 300 and the remote control 200 receiving a message from the movable barrier operator 300 indicating the movable barrier operator 300 is ready to learn the remote control 200.

The controller 202 also has a normal operating mode for communicating with the movable barrier operator 300 after the movable barrier operator 300 has learned the remote control 200. In the normal operating mode, the controller 202 operates the first transmitter 206 to transmit a radio frequency communication via the first communication protocol in response to a user input at the user interface 201. The controller 202 may remain in the normal operating mode unless a predetermined user input is received at the user interface 201 which causes the controller 202 to temporarily reconfigure to a second operational mode (e.g., a legacy training mode).

In the legacy training mode, the controller 202 operates the first transmitter 206 and first receiver 207 to transmit and receive radio frequency communications via the first communication protocol and additionally operates the second transmitter 208 and second receiver 209 to transmit and receive radio frequency communications via the second communication protocol in response to a particular user input at the user interface 201 (FIG. 1).

In one example, the particular user input is the user pressing and holding a button of the user interface 201 for a duration of time that is greater than or equal to a threshold duration of time. In this example, the controller 202 measures the duration of time the button is pressed/held, and if the controller 202 determines that the duration of time the button is being pressed/held is less than the threshold duration of time, the controller 202 defaults to the normal operating mode. In some examples, the controller 202 is in the normal operating mode when the user initially presses the button of the user interface 201. In the normal operating mode, the controller 202 causes the first transmitter 206 and first receiver 207 to transmit and receive radio frequency communications via the first communication protocol. However, once the controller 202 determines that the user has pressed/held down the button for a duration of time that is equal to or greater than the threshold duration of time, the controller 202 reconfigures/changes to the legacy training mode and causes the second transmitter 208 to send (e.g., transmit or broadcast) a radio frequency communication via the second communication protocol.

The remote control 200 includes a power source 205, such as a battery, a memory 204, a clock or timer 230, and a switch 231 which are similar in many respects to the corresponding components of the trainable transmitter 100. For example, the memory 204 may store transmitter information including as a fixed code identifying the remote control 200. The fixed code may be a globally unique identifier (GUID) for the remote control 200. The memory may also store information regarding transmitter type, button IDs, and changing code information and algorithms. In embodiments wherein the first communication protocol is a bidirectional communication protocol, the timer 230 may include a clock used to measure time windows for receiving and broadcasting communications.

Figure 4:
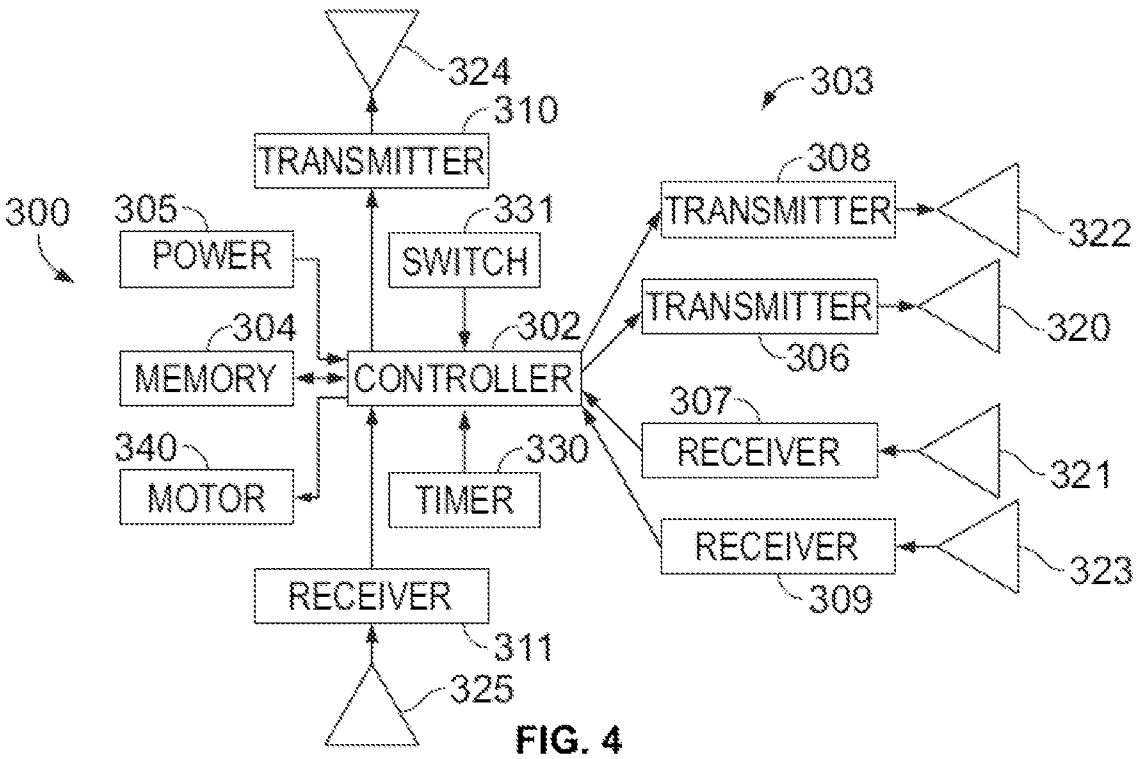
FIG. 4 is a block diagram of the movable barrier operator of FIG. 1.

Referring now to FIG. 4, in one example, the movable barrier operator 300 includes a controller 302 in communication with a memory 304 and is configured for storing and retrieving data to and from the memory 304 as well as processing data and carrying out commands. A power source 305, such as an AC power circuit or outlet and/or battery, supplies electricity to the controller 302 in order to allow operation.

The movable barrier operator 300 also includes communication circuitry 303 having a first transmitter 306 and a first receiver 307 in operative communication with the controller 302. The first transmitter 306 and the first receiver 307 may be provided as a transceiver. The first transmitter 306 and the first receiver 307 are capable of communicating radio frequency signals with the remote control 200 via the first communication protocol. As shown, the first transmitter 306 communicates with a first antenna 320 and the first receiver 307 communicates with a second antenna 321, but both the first transmitter 306 and the first receiver 307 may communicate with a single antenna or multiple antennas.

The movable barrier operator 300 also includes a second receiver 309 in communication with an antenna 323. The second receiver 309 and antenna 323 are configured to receive radio frequency communications from the trainable transmitter 100 and the remote control 200 via the second communication protocol. In one embodiment, the second communication protocol is a legacy unidirectional communication protocol. The communication circuitry 303 may include a second transmitter 308 in communication with an antenna 322. In one embodiment, the second receiver 309 and antenna 323 receive control commands from the trainable transmitter 100 via the second communication protocol and the second transmitter 308 and antenna 322 transmit door status information to the trainable transmitter 100 via the second communication protocol.

The movable barrier operator 300 also includes a third transmitter 310 and a third receiver 311 in operative communication with the controller 302. The third transmitter 310 and the third receiver 311 are capable of sending and receiving communications using a third communication protocol, respectively. As shown, the third transmitter 310 communicates with a fifth antenna 324 and the third receiver 311 communicates with a sixth antenna 325, but both of the third transmitter 310 and the third receiver 311 may communicate with a single antenna or multiple antennas. The third transmitter 310 and the third receiver 311 may be provided as a transceiver. For example, the third transmitter 310 and the third receiver 311 may be provided as a Wi-Fi transceiver or other wide-area communication interface (e.g. cellular radio). The communication circuitry 303 may include an I/O interface for wired communications, such as signals from the wall control 39, optical emitter 42, and optical detector 46. Movable barrier operator 300 may also include a timer 330 in communication with, or a component of, the controller 302. In one example, the timer 330 includes a clock used to measure time windows for receiving and broadcasting communications.

The controller 302 of the movable barrier operator 300 is connected to a motor 340 and may operate the motor 340 to carry out an operation such as opening or closing a garage door; sliding, swinging, or rotating a gate; or otherwise moving or repositioning a movable barrier. The user interface 301 (FIG. 1) may include one or more buttons operatively connected to one or more switches 331. The buttons may be used to, for example, reconfigure the controller 302 to a first communication protocol learning mode wherein the controller 302 may learn a remote control 200 that communicates using the first communication protocol.

In one embodiment, the controller 302 has a second communication protocol learning mode wherein the controller 302 may learn the trainable transmitter 100 that communicates using the second communication protocol. However, the second communication protocol learning mode is not user-initiated via a user interface. Instead, the controller 302 enters the second communication protocol learning mode in response to the previously learned remote control 200 broadcasting a radio frequency communication via the first communication protocol as discussed in greater detail below. In this embodiment, a user would be unable to cause the controller 302 to enter the second communication protocol learn mode by pressing the learn mode button of the user interface 301.

Figure 5:
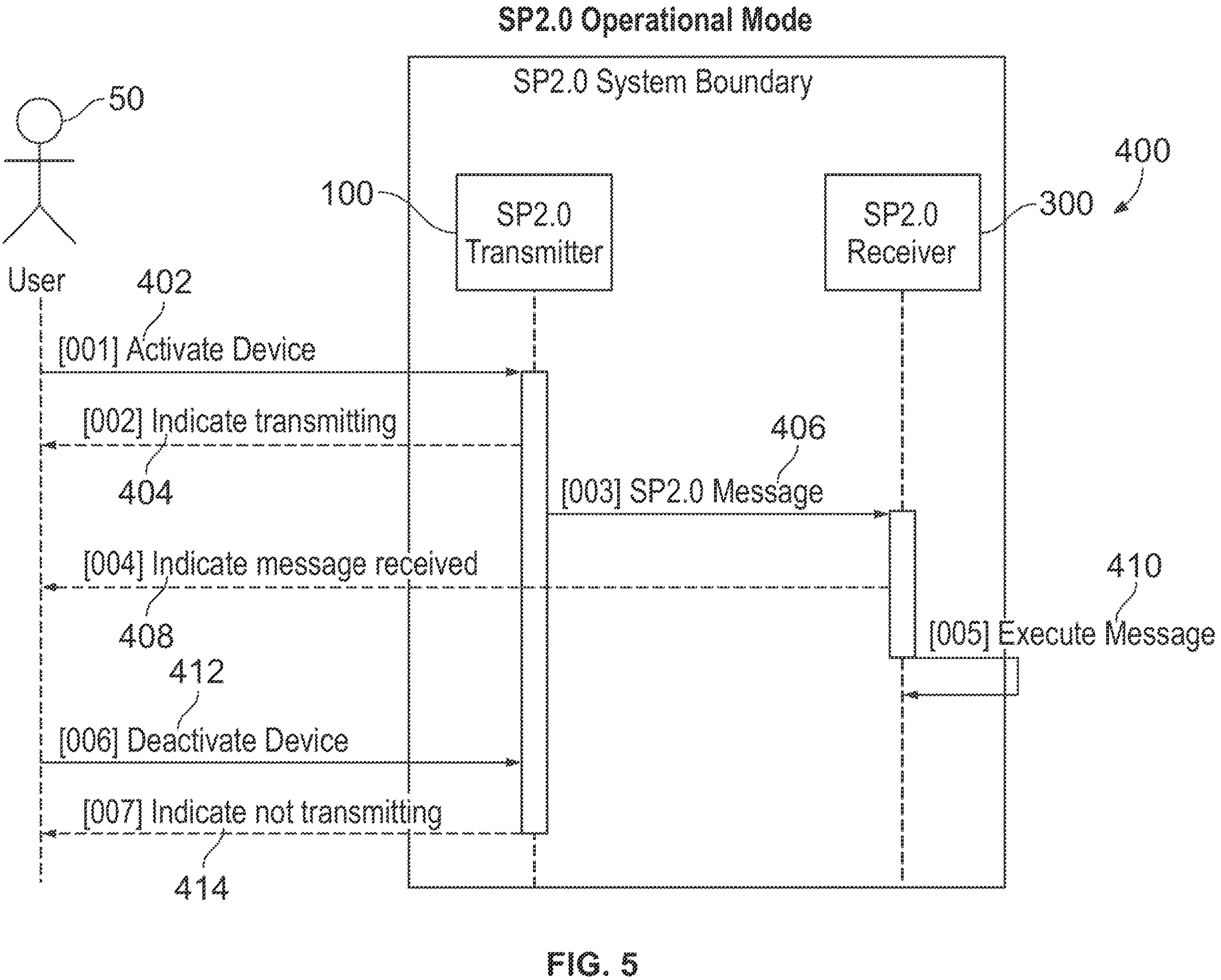
FIG. 5 is a flow diagram illustrating a method of operating a controllable device using a second communication protocol.

With reference to FIG. 5, a method 400 is provided of operating the movable barrier operator 300 using the trainable transmitter 100 via the second communication protocol. The trainable transmitter 100 has previously been learned by the movable barrier operator 300 using the method discussed below with respect to FIGS. 9A-9F. In the embodiment of FIG. 5, the second communication protocol includes a Security+2.0 code format (abbreviated as "SP2.0").

The method 400 includes, at 402, a user 50 providing a user input (e.g., a button press) to the user interface 101 of the trainable transmitter 100. Optionally, at 404, the trainable transmitter 100 indicates to the user 50 that the trainable transmitter 100 is sending a signal (e.g., transmitting or broadcasting) such as by illuminating an LED of the trainable transmitter 100.

The method 400 further includes, at 406, the trainable transmitter 100 sending (e.g., transmitting or broadcasting) the signal, for example, a radio frequency communication, using the second communication protocol. The radio frequency communication includes a message that includes a command configured to cause the movable barrier operator 300 to perform an operation, such as moving a movable barrier (e.g., the garage door 24) between open and closed positions.

The command transmitted by the trainable transmitter 100 at operation 406 using the second communication protocol is received by the movable barrier operator 300. The method 400 optionally includes, at 408, the movable barrier operator 300 providing an indication to the user 50 that the message/command from the trainable transmitter 100 has been received. In one embodiment, providing the indication at 408 includes the movable barrier operator 300 flashing an LED of the movable barrier operator 300.

At 410, the movable barrier operator 300 executes the command (e.g., the command in the message received from the trainable transmitter 100), such as by operating the motor 340 (see FIG. 4) to change a position of the garage door 24 (see FIG. 1) from a first position to a second position (e.g., from an open position to a closed position or from the closed position to the open position).

At 412, the user 50 deactivates the trainable transmitter 100 by, for example, removing the user input provided at 402 (e.g., the user 50 releases the button(s) on the trainable transmitter 100 from operation 402). For example, the user causes the trainable transmitter 100 to stop sending the message using the second communication protocol by the user no longer providing the user input. That is, a user may press a button (i.e., provide the user input) of the trainable transmitter 100 at 402 and release the button at 412. Optionally, at 414, the trainable transmitter 100 indicates that the trainable transmitter 100 is no longer sending the message (e.g., no longer transmitting or broadcasting the radio frequency communication using the second communication protocol) in response to the deactivation at 412.

Figure 6:
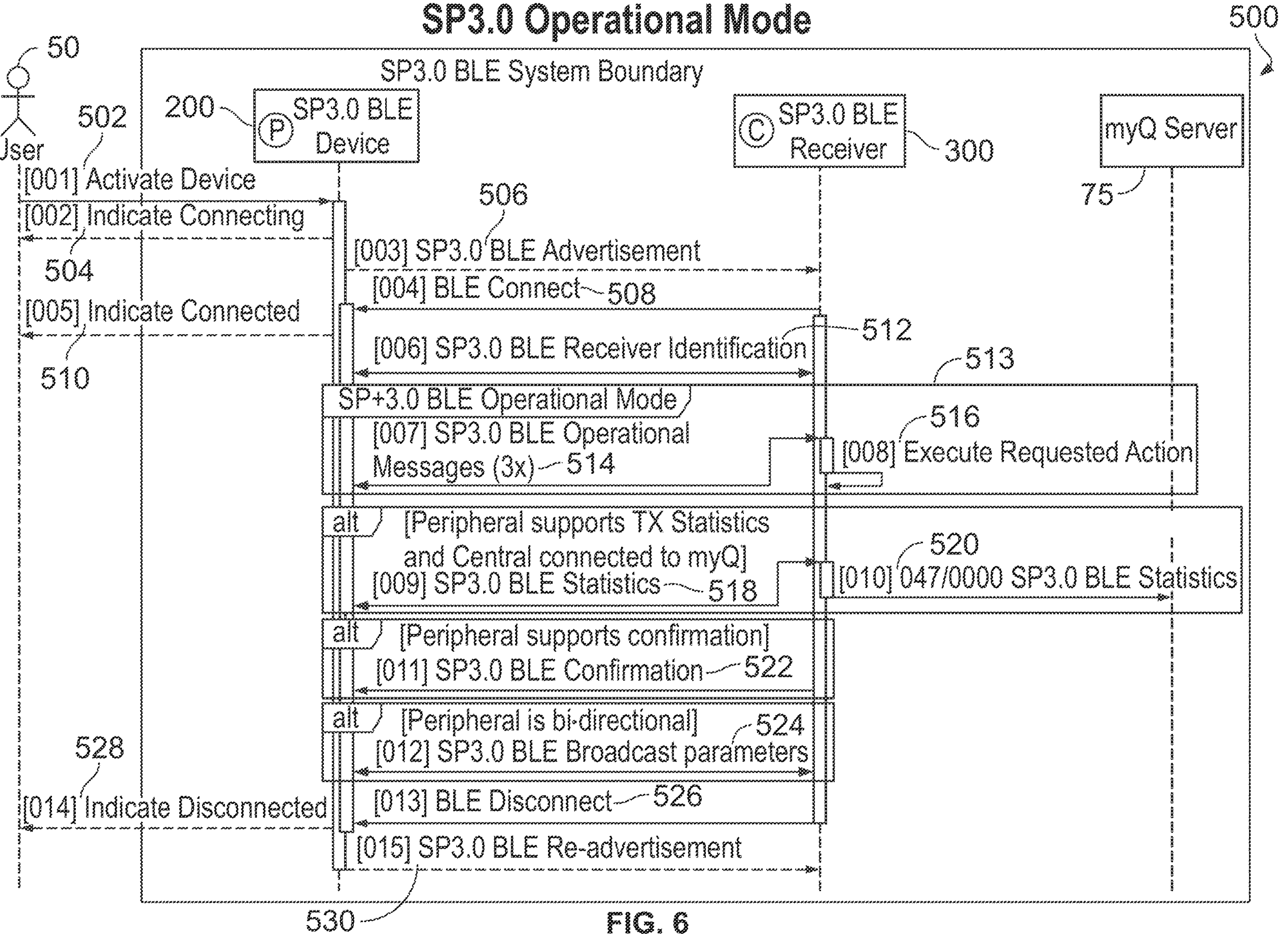
FIG. 6 is a flow diagram illustrating a method of operating a controllable device using a first communication protocol.

With reference to FIG. 6, a method 500 is provided for operating the movable barrier operator 300 with the remote control 200 via the first communication protocol (e.g., while the remote control 200 is in the normal operating mode). As explained above, the remote control 200 has a normal operating mode for communicating with the movable barrier operator 300 after the movable barrier operator 300 has learned the remote control 200. While the remote control 200 is in the normal operating mode, the controller 202 of the remote control 200 operates the first transmitter 206 to transmit a radio frequency communication via the first communication protocol in response to a user input at the user interface 201. The remote control 200 may remain in the normal operating mode unless a predetermined user input is received at the user interface 201 which causes the controller 202 to temporarily reconfigure to operate in a second operational mode (e.g., a legacy training mode).

The method 500 includes, at 502, the user 50 providing a user input to the user interface 201 of the remote control 200. In one example, the user input at 502 is the user pressing a button of the remote control 200. In one example, at operation 504, the remote control 200 indicates that the remote control 200 is connecting to the movable barrier operator 300.

At 506, the remote control 200 sends (e.g., transmits or broadcasts) a communication, for example, a Bluetooth® Low Energy ("BLE") advertisement, and the movable barrier operator 300 responds to a receipt of the communication by sending (e.g., transmitting or broadcasting), at 508, information to establish a BLE connection. In this example, operations 506 and 508 are performed pursuant to the first communication protocol. In one example, at operation 510, the remote control 200 provides an indication (e.g., a notification) that the remote control 200 has connected to the movable barrier operator 300.

Thus, at 506, the movable barrier operator 300 detects the advertisement sent from remote control 200 and at 508 the movable barrier operator connects to the remote control 200 using the first communication protocol. In one embodiment, the operations at 506 and 508 are performed using a long-term key previously established as part of a public/private key exchange. In another example, at 510, the remote control 200 provides an indication to the user 50 that the remote control 200 is connected with the movable barrier operator 300.

At 512, the remote control 200 and movable barrier operator 300 exchange information to establish, at 513, a BLE operational mode. The remote control 200 and movable barrier operator 300 communicate, at 514, messages including fixed codes and changing codes to authenticate the remote control 200 and the movable barrier operator 300 as discussed below with respect to FIGS. 8A and 8B. Upon a successful exchange of messages, at 516, the movable barrier operator 300 executes the requested action such as moving the garage door 24 (as shown in FIG. 1) from an open position to a closed position or from a closed position to an open position.

In some examples, the method 500 includes additional operations that are performed depending on a configuration of the remote control 200. In one example, the remote control 200 supports transmitter statistics. In this example, the method 500 includes, at 518, a communication of BLE statistics that the movable barrier operator 300 communicates, at 520, to a remote device, such as a server computer 75. In another example, the remote control 200 supports a BLE confirmation. In this example, the movable barrier operator 300 communicates, at 522, a BLE confirmation to the remote control 200. In yet another example, the remote control 200 supports bidirectional exchange of broadcast parameters. In this example, the method 500 includes a communication, at 524, of broadcast parameters between the remote control 200 and the movable barrier operator 300.

At 516, after the movable barrier operator 300 executes the requested action, the movable barrier operator 300 disconnects, at operation 526, from the remote control 200. In one example, the remote control 200 provides an indication at 528 that the movable barrier operator 300 has been disconnected from the remote control 200 and, as such, the remote control 200 begins re-advertising at 530.

Figure 7A:
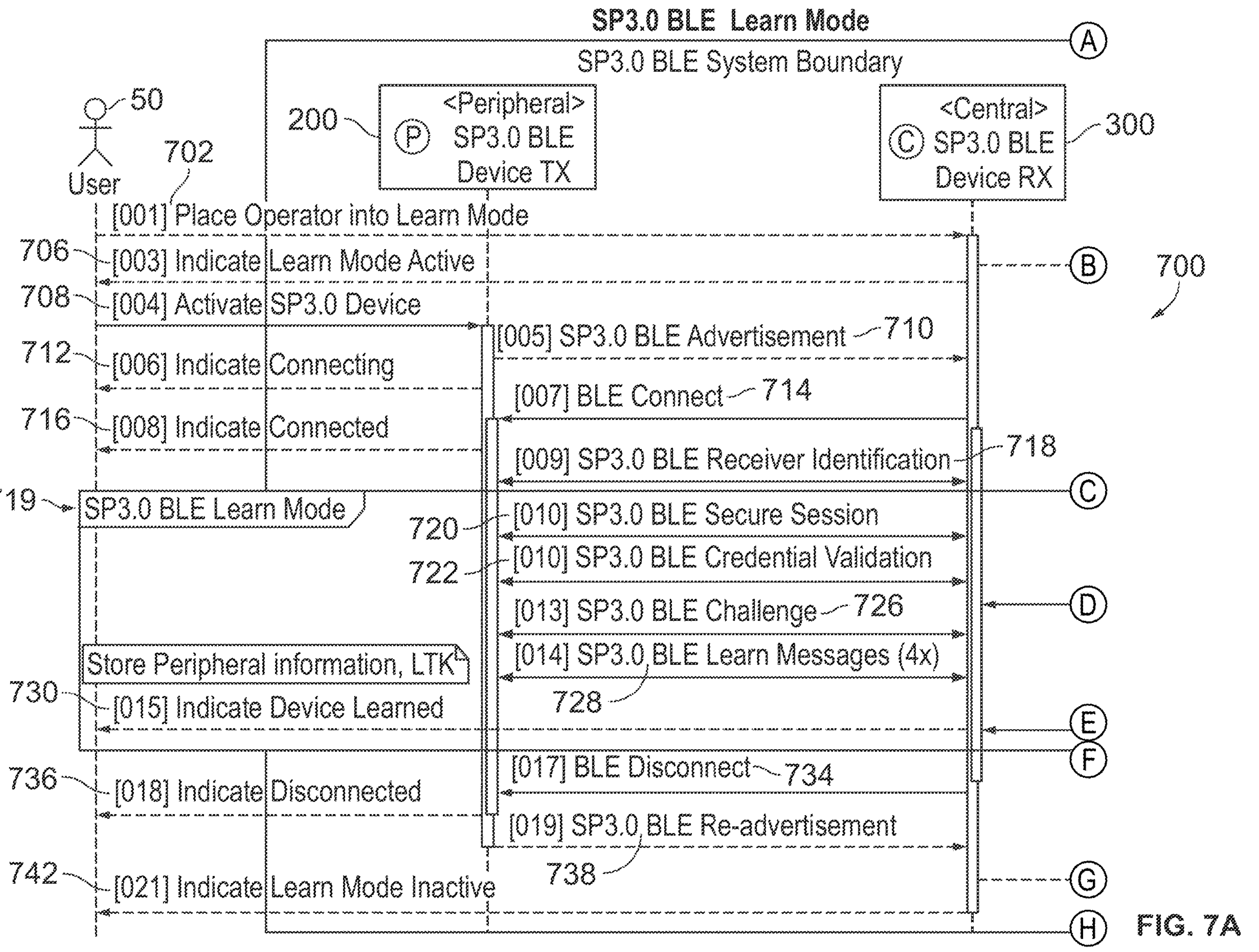
FIGS. 7A and 7B show a flow diagram illustrating a method of pairing a remote control with a movable barrier operator using the second communication protocol.
Figure 7B:
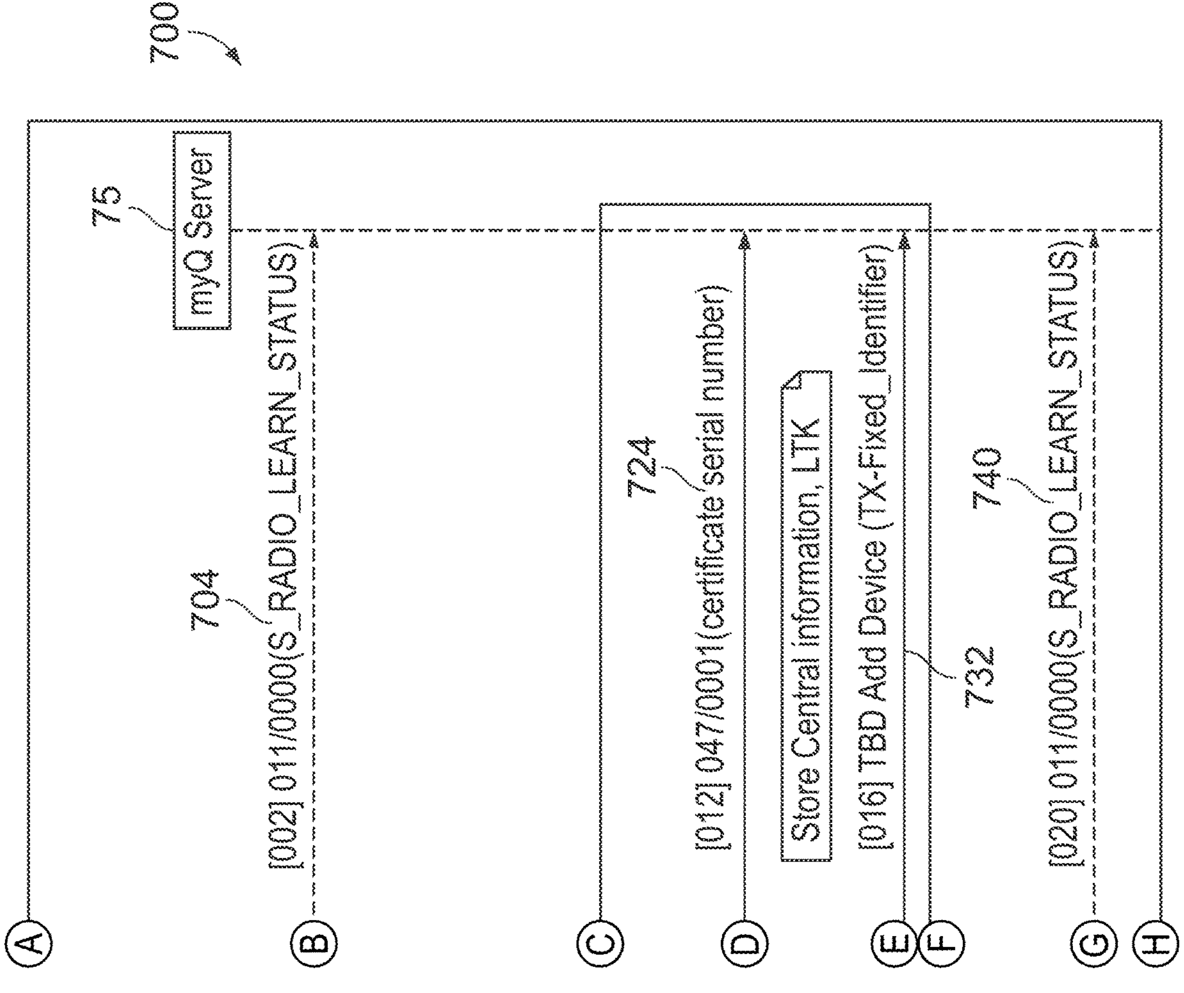

With reference to FIGS. 7A and 7B, a method 700 is provided for pairing the remote control 200 with the movable barrier operator 300 using the first communication protocol. At 702, the user 50 places the movable barrier operator 300 into a first communication protocol learn mode, by for example, pressing a button of the user interface 301 of the movable barrier operator 300. In one example, the movable barrier operator 300 communicates, at 704, a message to the server computer 75. In this example, the message indicates that the movable barrier operator 300 has been placed in the first communication protocol learn mode. In one example, the movable barrier operator 300 provides, at 706, an indication to the user 50, such as by flashing a LED of the user interface 301, that the movable barrier operator 300 has entered the first communication protocol learn mode.

At 708, the user 50 activates the remote control 200 by providing a user input to the user interface 201 of the remote control 200. At 710, while the movable barrier operator 300 is in the first communication protocol learn mode, the remote control 200 sends (e.g., transmits or broadcasts) an advertisement to the movable barrier operator 300 using the first communication protocol. In one example, at 712, the remote control 200 provides an indication to the user 50 that the remote control 200 is connecting to the movable barrier operator 300.

At 714, the movable barrier operator 300 connects to the remote control 200 using the first communication protocol. In one example, at 716, the remote control 200 provides an indication to the user 50 that the remote control 200 has connected to the movable barrier operator 300, such as by flashing an LED or presenting a message via a touchscreen display of the user interface 201 of the remote control 200.

At 718, the remote control 200 and movable barrier operator 300 communicate BLE receiver information before starting the first communication protocol (e.g., SP3.0 BLE learn mode) at 719. For example, the first communication protocol learn mode is a bidirectional exchange of Sec+3 messages (see operation 728 "4×" messages), which is wireless agnostic. In some examples, the communications are directed to Sec+3 over Bluetooth®. In some examples, operation 719 is for a conventional Bluetooth® pairing process to establish a secure BT channel in advance of the Sec+3 messages exchange.

The remote control 200 and movable barrier operator 300 perform a public/private key exchange at 720, a credential validation at 722, and a challenge at 726 before exchanging messages containing fixed codes and changing codes at 728. In one example, at 722, the credential validation includes the movable barrier operator 300 authenticating a certificate of the remote control 200. In one embodiment, the credential validation at 722 includes initiating, at 724, the movable barrier operator 300 communicating with the server computer 75 regarding whether the certificate of the remote control 200 has been revoked.

Upon a successful completion of operations 720-728, the movable barrier operator 300 communicates a long term key 'LTK' to the remote control 200 that the movable barrier operator 300 and the remote control 200 use to encrypt and decrypt subsequent communications. The movable barrier operator 300 learns the remote control 200 by storing, in the memory 304 of the movable barrier operator 300, a fixed code (e.g., a fixed identifier) and a changing code (e.g., a rolling/variable code) of the remote control 200. For example, the controller 302 of the movable barrier operator 300 adds the fixed code and the changing code of the remote control 200 to a whitelist maintained by the controller 302 of the movable barrier operator 300. At 732, the movable barrier operator 300 communicates the fixed code of the remote control 200 to the server computer 75 to indicate to the server computer 75 that the movable barrier operator 300 has learned the remote control 200. At 734, the BLE learn mode is complete and the movable barrier operator 300 disconnects from the remote control 200.

In some examples, at 730, the movable barrier operator 300 communicates an indication to the user 50, such as flashing a light of the movable barrier operator 300, that the remote control 200 has been learned by the movable barrier operator 300. In some examples, at 736, an indication is communicated once the remote control 200 has disconnected from the movable barrier operator 300. In some examples, the remote control 200 re-advertises at 738, the movable barrier operator 300 communicates a message to the server computer 75 that the movable barrier operator 300 has completed learning the remote control 200 at 740, and the movable barrier operator 300 communicates to the user 50 that the first communication protocol learn mode has ended at 742.

Figure 8A:
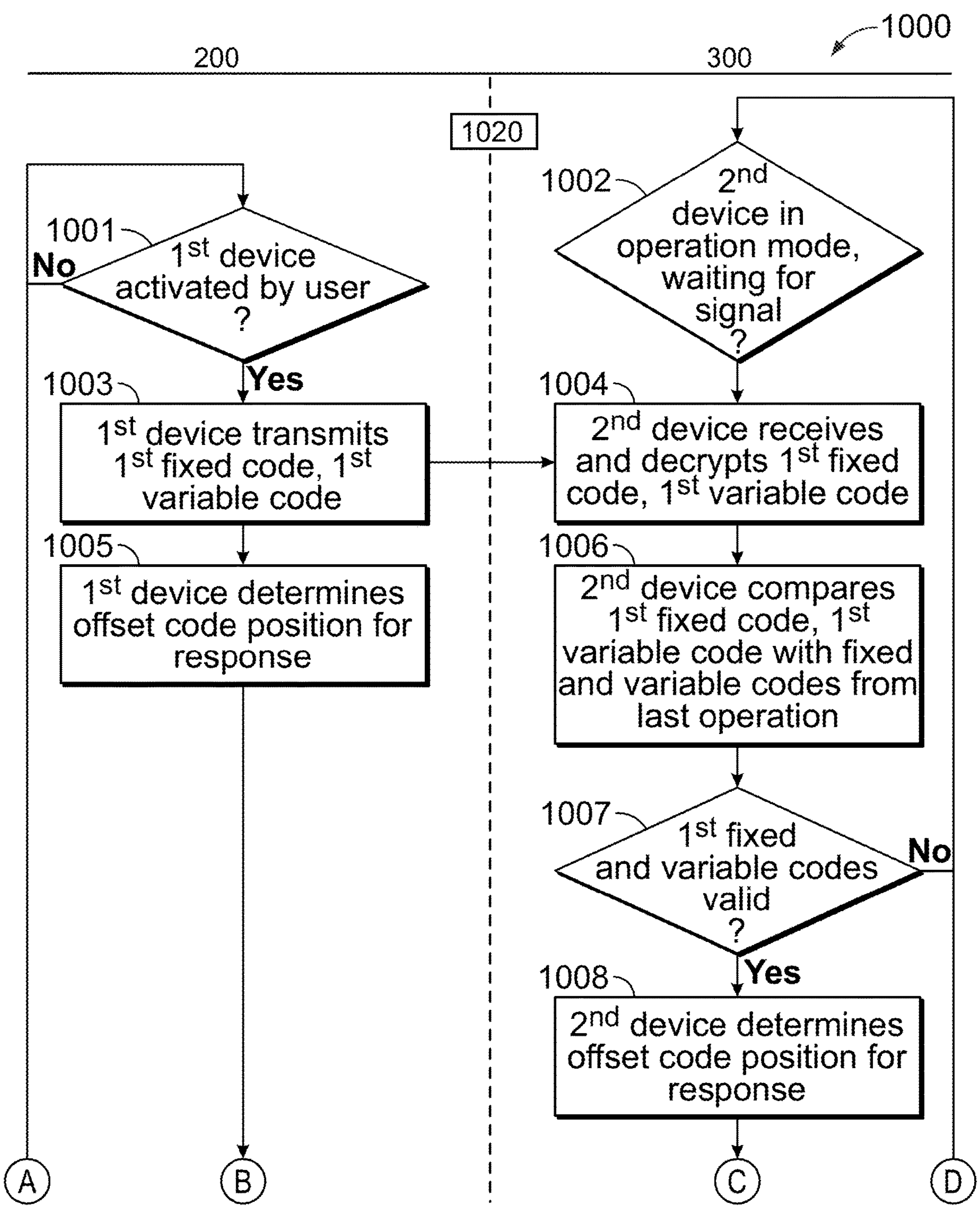
FIGS. 8A and 8B show a flow diagram illustrating a method of using a remote control to operate a controllable device using the first communication protocol.
Figure 8B:
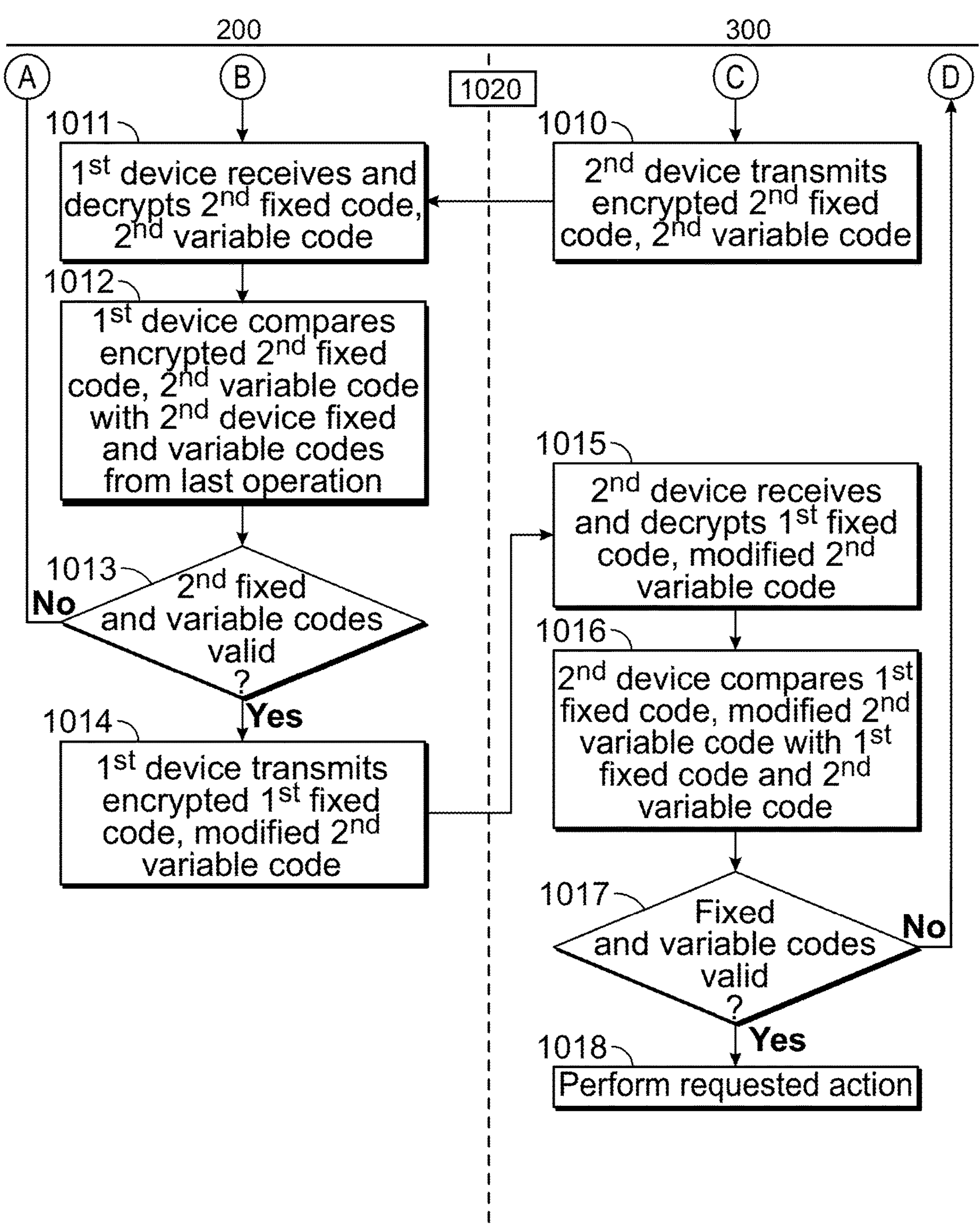

FIGS. 8A and 8B are interconnected flow charts that demonstrate steps of examples of a process in which signals are exchanged between a first device (e.g., the remote control 200) and a second device (e.g., the movable barrier operator 300) to verify authorization and carry out an activity. Steps to the left of central dashed line 1020 in FIGS. 8A and 8B relate to the remote control 200, while steps to the right of the central dashed line 1020 relate to the movable barrier operator 300. In this example, a previous operation such as a learning procedure or an operation sequence has previously been performed so that each of the remote control 200 and the movable barrier operator 300 have stored information received from each other.

More specifically, the remote control 200 has stored in the memory 204 a first fixed code of the remote control 200, a first version (e.g., current version) of a changing code of the remote control 200, a second fixed code of the movable barrier operator 300, and a changing code of the movable barrier operator 300 from a most recent operation of the movable barrier operator 300 with the remote control 200. Similarly, the movable barrier operator 300 has stored in the memory 304 the second fixed code of the movable barrier operator 300, a second version (e.g., current version) of the changing code of the movable barrier operator 300, the first fixed code of the remote control 200, and a changing code of the remote control 200 from the most recent operation of the movable barrier operator 300 with the remote control 200.

At 1001, the remote control 200 assesses whether the remote control 200 has been activated. For example, the remote control 200 determines that a user pressed a button on the user interface 201 of the remote control 200, which completes an electrical circuit or effects a measurable change in at least one component of the remote control 200. When the remote control 200 has not been activated, it continues to await activation.

Once activated, the remote control 200 sends (e.g., transmits or broadcasts) at 1003 a first message that includes at least the first fixed code and the first version of the changing code. In some examples, the first version of the changing code represents a modification from a changing code in an immediately previous operation. In some examples, the sending (e.g., transmitting or broadcasting) of the first message at 1003 includes encrypting the first fixed code and/or the first version of the changing code. In some embodiments, encryption includes using a predetermined number of bits of the first version of the changing code as a basis for selecting a particular data bit order pattern and particular data inversion pattern. At 1005, the remote control 200 specifies or determines an offset code position for an anticipated response (in this example, a position in a forthcoming second message from the movable barrier operator 300 wherein the position is offset from a preamble or header of the second message and where fixed codes and changing codes from the movable barrier operator 300 are located). In some examples, the determination at 1005 takes place before or after sending (e.g., transmitting or broadcasting) the first message at 1003 by the remote control 200. In some embodiments, the determination of the offset code position by the remote control 200 is made prior to generating the first message sent (e.g., transmitted or broadcast) at 1003, and information regarding the offset code position is used in generating the first message.

In some examples, the remote control 200 generates the first message (or portions thereof) and then determines the offset position based on characteristics of the first message. In some embodiments, the determination of the offset code position is made randomly (e.g., using a random or pseudo-random number generator) or is based on at least a portion of the first encrypted message or from at least a portion of an unencrypted changing code, or both. In some examples, the determination of the offset code position is made based on a fixed code or other portion of an encrypted or unencrypted version of the first message.

At 1002, the movable barrier operator 300 is in operation mode and awaits a signal to affect an action, and upon receiving the first message from the remote control 200 at 1004, the movable barrier operator 300 decrypts the first message to obtain the first fixed code and first version of the changing code. The movable barrier operator 300 stores the first fixed code and first version of the changing code in the memory 304, and at 1006 validates the first fixed code and the first version of the changing code by comparing the first fixed code and the first version of the changing code to stored code values. For example, at 1006, the first fixed code and first version of the changing code from the encrypted first message are compared to a stored first fixed code and a stored changing code (e.g., stored in the memory 304) from a previous operation. If the first fixed code matches the stored first fixed code from the previous operation and the first version of the changing code from the encrypted first message matches the stored changing code as modified according to a set of established rules for changing/variable codes (e.g. matches a subsequent value from a predetermined sequence or algorithm), the encrypted first message is considered validated.

If the first fixed code and first version of the changing code from the encrypted first message do not match the stored first fixed code and the stored changing code from the previous operation, the movable barrier operator 300 ignores the first message and waits, at 1002, for further signals. On the other hand, if the first fixed code and first version of the changing code from the encrypted first message do match the stored first fixed code and the stored changing code from the previous operation and thus are considered valid at 1007, the movable barrier operator 300 determines, at 1008, an offset code position based on the encrypted first message, in which to include the second fixed code and the second version of the changing code in a response, at 1010, to be sent (e.g., transmitted or broadcast) by the movable barrier operator 300.

In response to validating the encrypted first message, and after determining the offset code position, the movable barrier operator 300 sends (e.g., transmits or broadcasts) the response at 1010 in the form of a second message. The second message comprises an encrypted second message including the second fixed code and the second version of the changing code (e.g., that is, in the depicted embodiment, independent from the first changing code and represents a modified version of a changing code from an immediately previous operation). The second fixed code and the second version of the changing code are positioned within the second message at the determined offset code position so that a device (e.g., the remote control 200) receiving the second message can correctly locate the offset code position and accurately determine the second fixed code and the second version of the changing code. In one example, at this stage, the memory 304 of the movable barrier operator 300 contains a previous first fixed code and a previous first changing code from a previous operation, a previous second fixed code and a previous second changing code from the previous operation, the first fixed code and the version of the changing code from the encrypted first message transmitted at operation 1003 by the remote control 200, and the second fixed code and the second version of the changing code from the response transmitted by the movable barrier operator 300 at operation 1010.

At 1011, the remote control 200 receives and decrypts the encrypted second message, which includes the second fixed code and the second version of the changing code. The remote control 200 determines where to locate the second fixed code and second version of the changing code, either by identifying a position on the encrypted version of the second message where encrypted versions of the second fixed code and the second version of the changing code are located, and then decrypting all or a portion of the second message to reveal the second fixed code and the second version of the changing code, or by first decrypting the second message and then identifying the position of the second fixed code and the second version of the changing code.

If the remote control 200 has not determined the same offset code position that the movable barrier operator 300 determined when creating the encrypted second message, the remote control 200 is unable to locate the beginning of offset portion and thus cannot properly read the second fixed code and the second version of the changing code from the encrypted second message.

If, however, the remote control 200 has determined or otherwise knows, retrieves, or uses the appropriate offset code position for the encrypted second message, the remote control 200 is able to successfully identify the second fixed code and the second version of the changing code and store the second fixed code and the second version of the changing in the memory 204 of the remote control 200, the previous second fixed code and the previous second changing code from the previous operation, and the first fixed code and the first version of the changing code from the encrypted first message. In one example, the first fixed code and the first version of the changing code from the first message are no longer needed and are be deleted from the memory 204 of the remote control 200, after, for example, the second fixed code and the second version of the changing code are stored in the memory 204 of the remote control 200.

At 1012, the remote control 200 compares the second fixed code and second version of the changing code with a previous fixed code and a previous changing code from a previous operation (e.g., a most recent operation) stored in the memory 204 of the remote control 200. If the second fixed code matches the previous fixed code from the previous operation and the second version of the changing code matches the previous changing code from the previous operation as modified according to a set of established rules for the changing/variable codes, the encrypted second message is validated. If the second fixed code and the second version of the changing code are determined at 1013 to be valid, at 1014, the remote control 200 sends (e.g., transmits or broadcasts) an encrypted third message including at least the first fixed code and a modified version of the second version of the changing code. If the remote control 200 is unable to validate the encrypted second message from the movable barrier operator 300, the process ends and the remote control 200 returns to awaiting 1001 a subsequent activation.

In some examples, the position of the first fixed code and the modified version of the second version of the changing code are offset within the encrypted third message based on information from the first message or the second message in a manner similar to the offsetting of information within the second message based on information from the first message as described above, and the offsetting of the first fixed code and the modified version of the second version of the changing code in the encrypted third message are the same as or different than the offsetting of the second fixed code and the second version of the changing code in the second message.

At 1015, when the movable barrier operator 300 receives the encrypted third message, the movable barrier operator 300 decrypts the encrypted third message to determine the first fixed code and the modified version of the second version of the changing code. The movable barrier operator 300 also determines the location of the first fixed code and the modified version of the second version of the changing code if they have been offset within the encrypted third message. The values of the first fixed code and the modified version of the second version of the changing code are stored in the memory 304 of the movable barrier operator 300, which now contains the previous first fixed code and the previous first changing code from the previous operation, the first fixed code and the first version of the changing code from the first encrypted transmission, the previous second fixed code and the previous second changing code from the previous operation, the second fixed and the second version of the changing code from the encrypted second message (response), and the first fixed code and the modified version of the second version of the changing code from the encrypted third message. The movable barrier operator 300 then compares, at 1016, the first fixed code and the modified version of the second version of the changing code to stored code values comprising the first fixed code and an unmodified second changing code in order to validate, at 1017, the encrypted third message.

In some examples, the validation step at 1017 has a forward window of values that are acceptable (validation occurs when the received version of the changing/variable code is any one of the next several (e.g., twelve) values expected in a sequence), security is further increased by reducing the size of—or completely eliminating—this forward window. Therefore, in some embodiments, the encrypted third message is validated only if it contains the next variable code value in the sequence. If the encrypted third message is validated, the movable barrier operator 300 performs, at 1018, the requested action associated with activation (at 1001) of the remote control 200. If the movable barrier operator 300 is unable to validate the encrypted third message, the movable barrier operator 300 ends the process without performing the requested action and returns to awaiting signals from the remote control 200 at 1002. In some examples, the requested action is an opening or a closing of a moveable barrier.

With reference to FIGS. 9A-9F, a method 800 is provided for the trainable transmitter 100 to be learned by the movable barrier operator 300 using the remote control 200 as a facilitator device. In this example, the remote control 200 has previously been learned by the movable barrier operator 300 prior to the start of the method 800, such as by being programmed by the manufacturer or the user 50 performing the method 700. In the example described with reference the FIGS. 9A-9F, the trainable transmitter 100 communicates using the second communication protocol, whereas the remote control 200 communicates using both the first communication protocol and the second communication protocol. In the embodiment of FIGS. 9A-9F, the trainable transmitter 100 is a transmitter integrated in a vehicle (e.g., the vehicle 99), such as being a component of a dashboard or a rearview mirror.

In one example, if the user 50 is training the trainable transmitter 100 for a first time, the user 50 provides, at 802, a user input to the user interface 101 of the trainable transmitter 100. In some examples, the user input causes any information stored in the memory 104 of the trainable transmitter 100 to be erased. In one example, the user input is the pressing of a predetermined pattern of buttons or locations on the user interface 101, which causes all configuration information stored in the memory 104 to be erased. In another example, the user presses a button down for a predefined duration of time which causes all configuration information stored in the memory 104 to be erased.

At 804, the trainable transmitter 100 provides an indication, such as by a flashing LED, to the user 50 that any configuration saved in the trainable transmitter 100 has been erased from the memory 104 of the trainable transmitter 100. In some examples, at 806, after the trainable transmitter 100 has indicated to the user 50 that any configuration stored in the memory 104 of the trainable transmitter 100 has been erased (e.g., the predefined period of time has been met), the user releases the button held down on the user interface 101 to erase the configuration information from the memory 104.

In some examples, the previously learned remote control 200 is positioned in proximity to the trainable transmitter 100, such as one to three inches away from an outer surface of the remote control 200 to facilitate the training of the trainable transmitter 100. At 808, the user 50 provides a user input to the trainable transmitter 100 via the user interface 101 to initiate a training mode of the trainable transmitter 100, such as by pressing and holding a button on the user interface 101 of the trainable transmitter 100, to enable the trainable transmitter 100 to be trained to properly communicate with the movable barrier operator 300 and to operate the movable barrier operator 300. At 809, the controller 102 of the trainable transmitter 100 causes the receiver 107 to listen for a radio frequency communication transmitted using the second communication protocol. In some examples, at 810, the trainable transmitter 100 provides an indication to the user 50, such as flashing an LED, that the trainable transmitter 100 is ready to be programmed.

Contemporaneously with providing the user input to the trainable transmitter 100 at 808, at 812 the user 50 provides a second user input to the remote control 200, such as pressing and holding a button on the user interface 201 of the remote control 200. In some examples, the button being pressed at 812 is the same button previously programmed to operate the movable barrier operator 300.

In response to the user 50 providing the second user input at 812, at 814 the remote control 200 initially communicates with the movable barrier operator 300 via radio frequency communications that utilize the first communication protocol. For example, although the receiver 107 of the trainable transmitter 100 is listening, the trainable transmitter 100 is unable to decipher the radio frequency communications that utilize the first communication protocol because the receiver 107 of the trainable transmitter 100 is listening for radio frequency communications that utilize the second communication protocol. For example, the antenna 121 of the trainable transmitter 100 is not be tuned to receive signals at the frequency of the first communication protocol and the receiver 107 is not programmed to understand signals communicated via the first communication protocol.

Figure 9A:
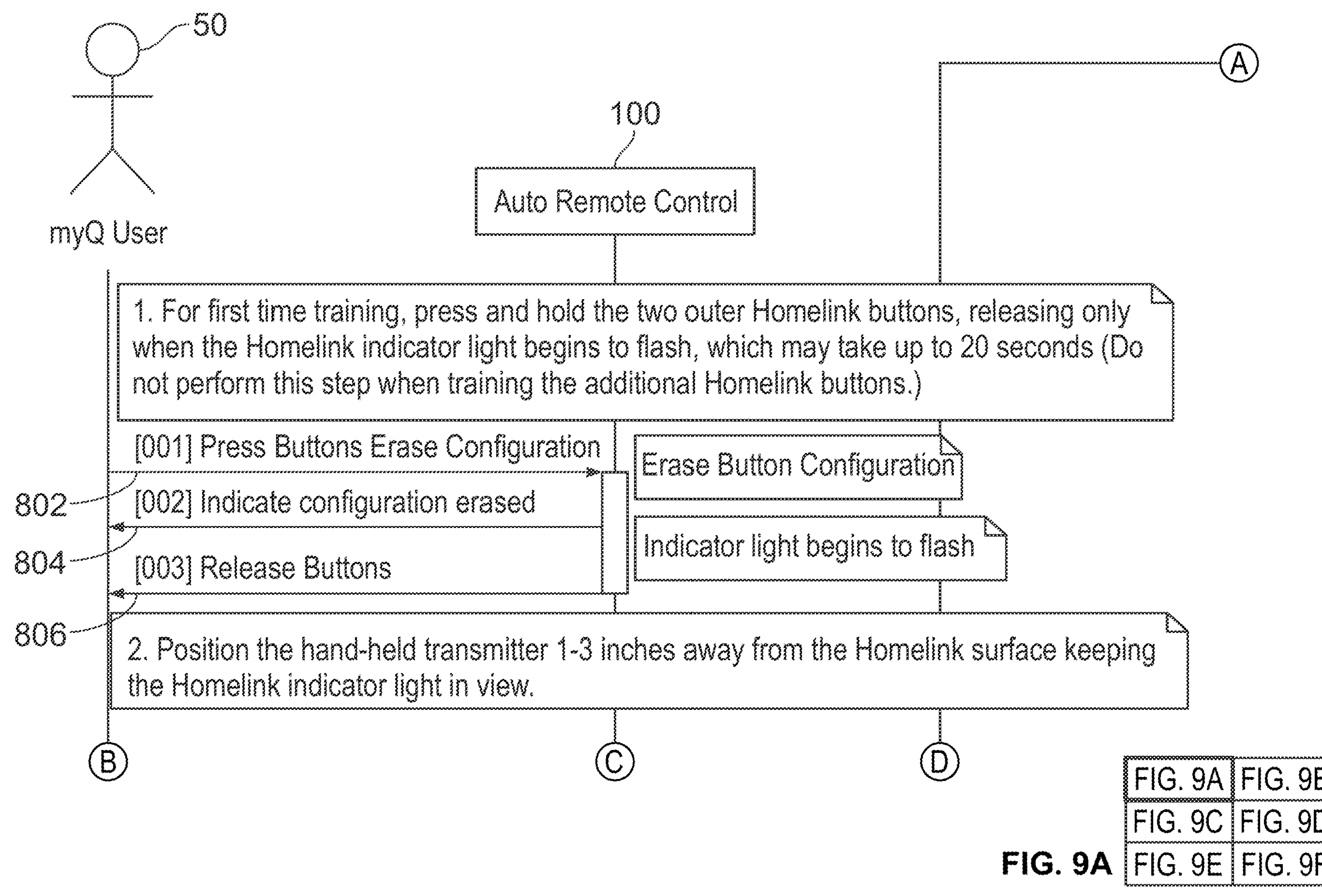
FIGS. 9A, 9B, 9C, 9D, 9E, and 9F show a flow diagram illustrating a method for pairing a trainable transmitter with a movable barrier operator using a remote control as an intermediary device.
Figure 9B:
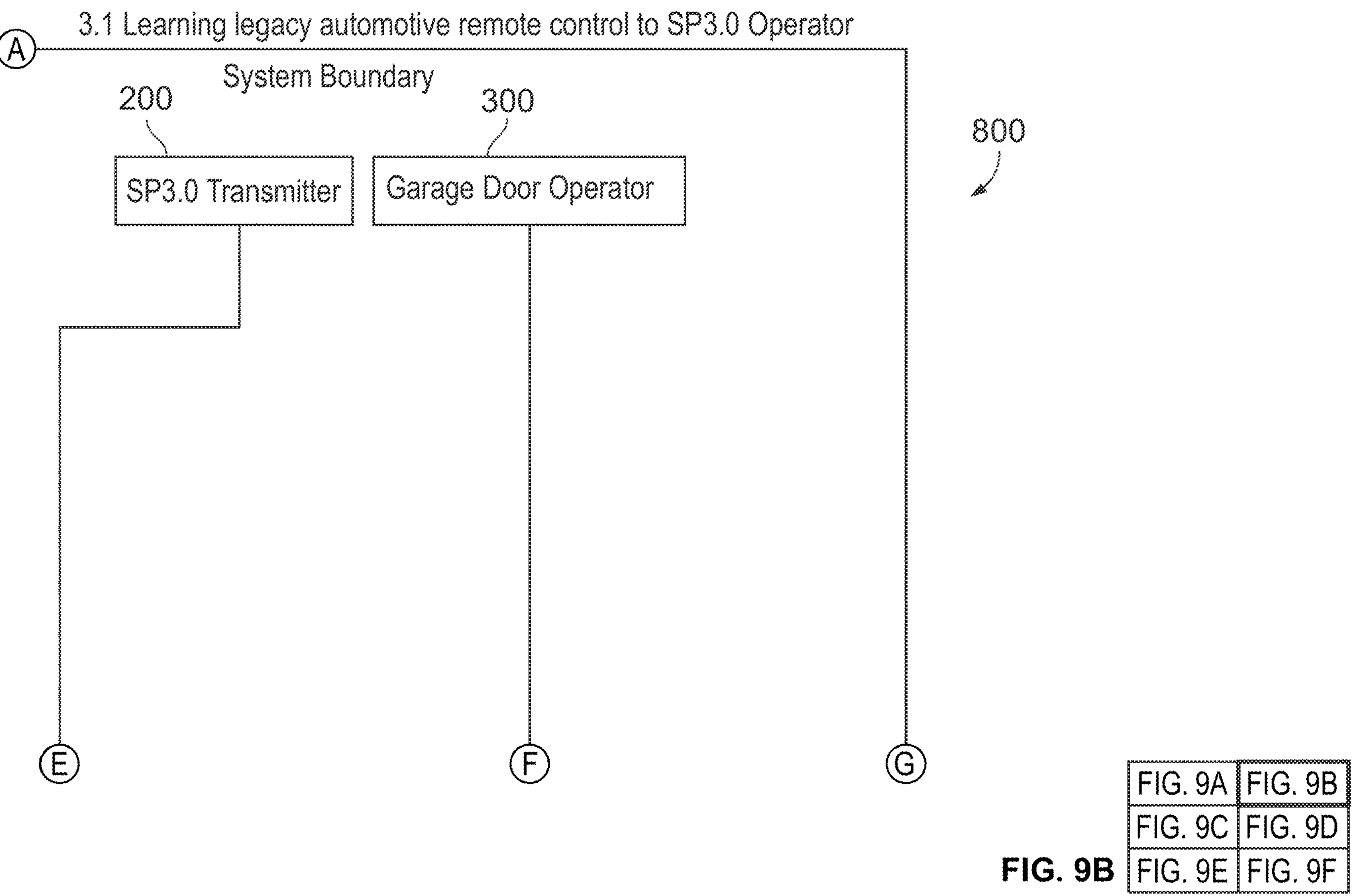
Figure 9C:
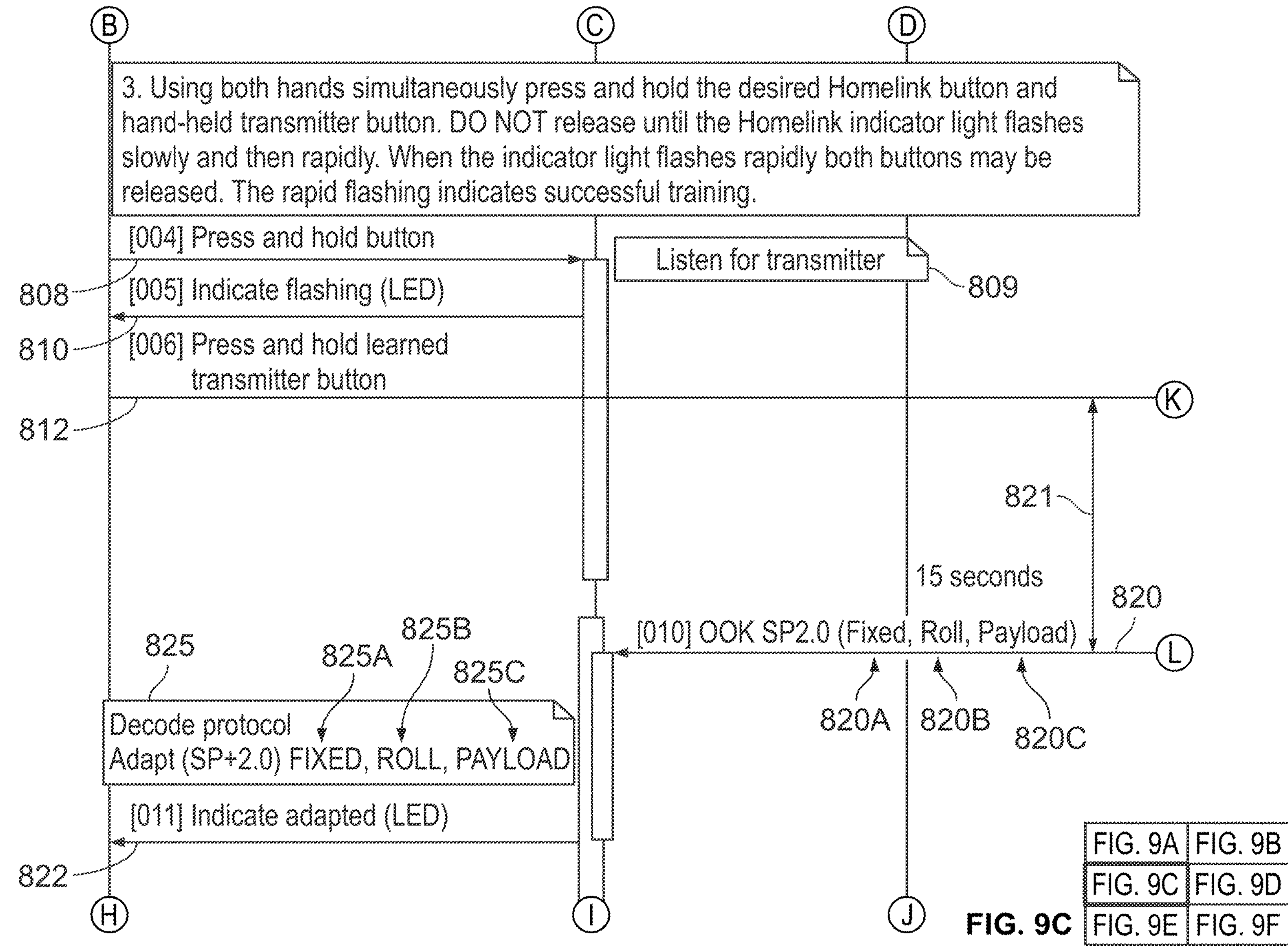
Figure 9D:
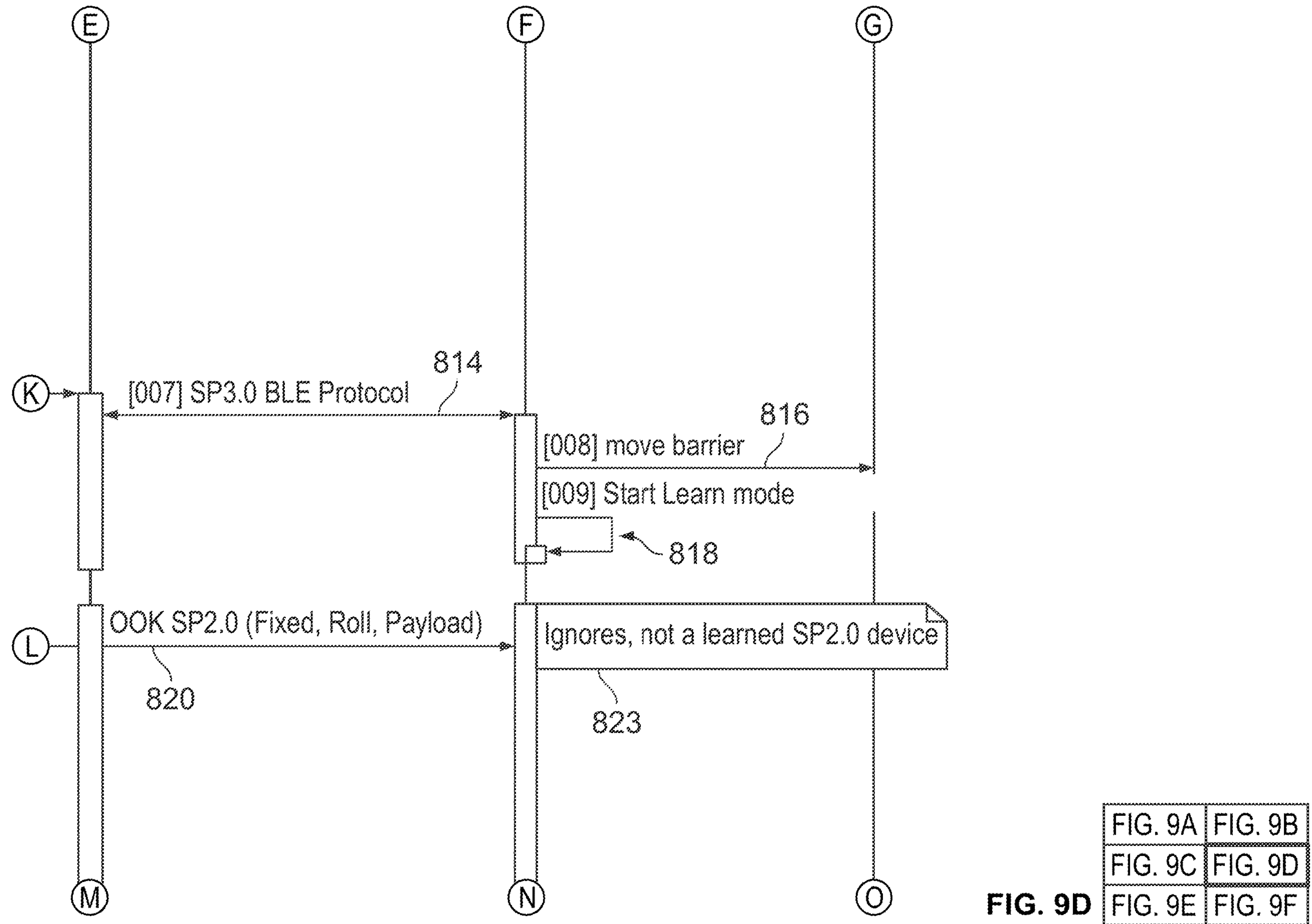
Figure 9E:
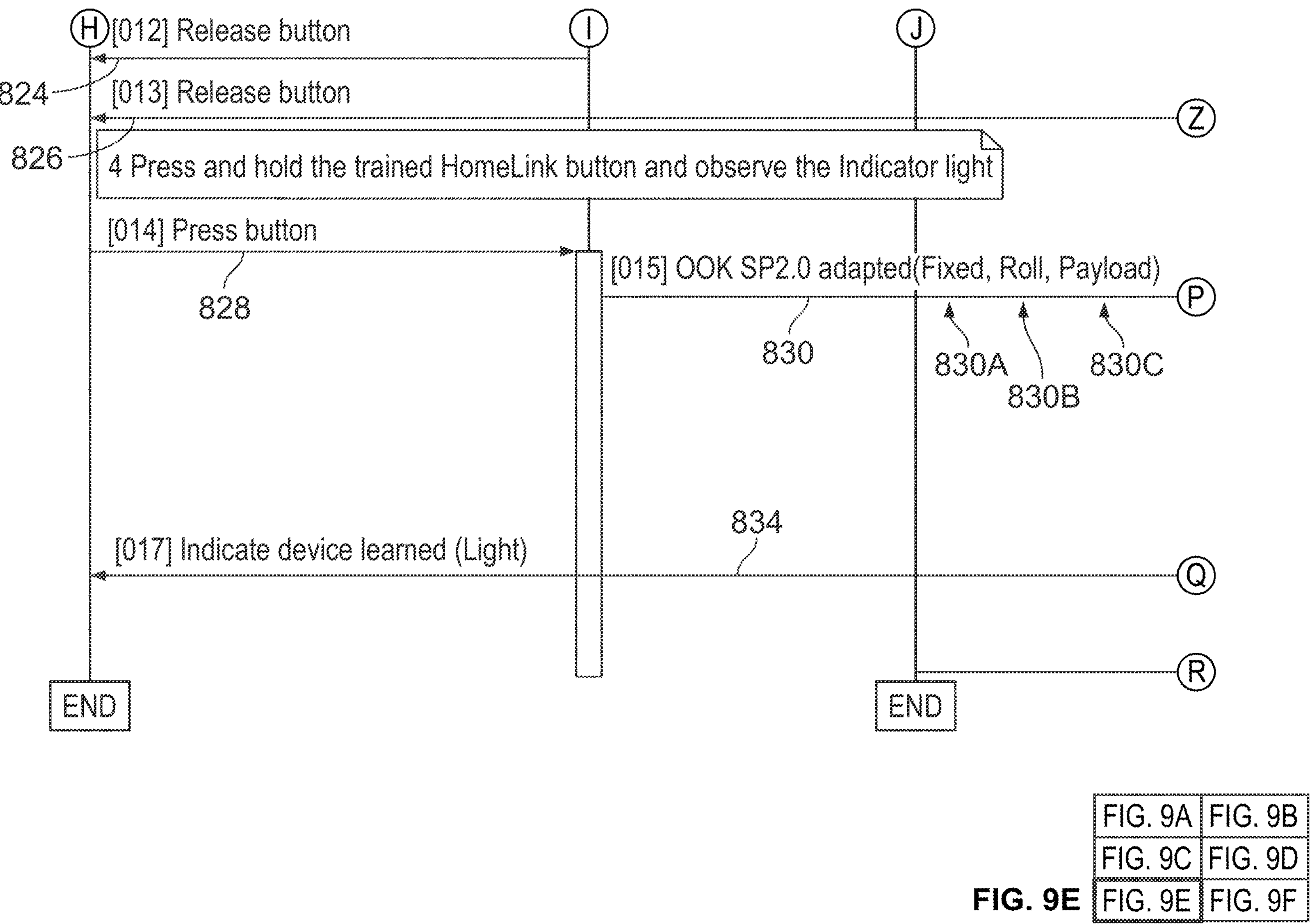
Figure 9F:
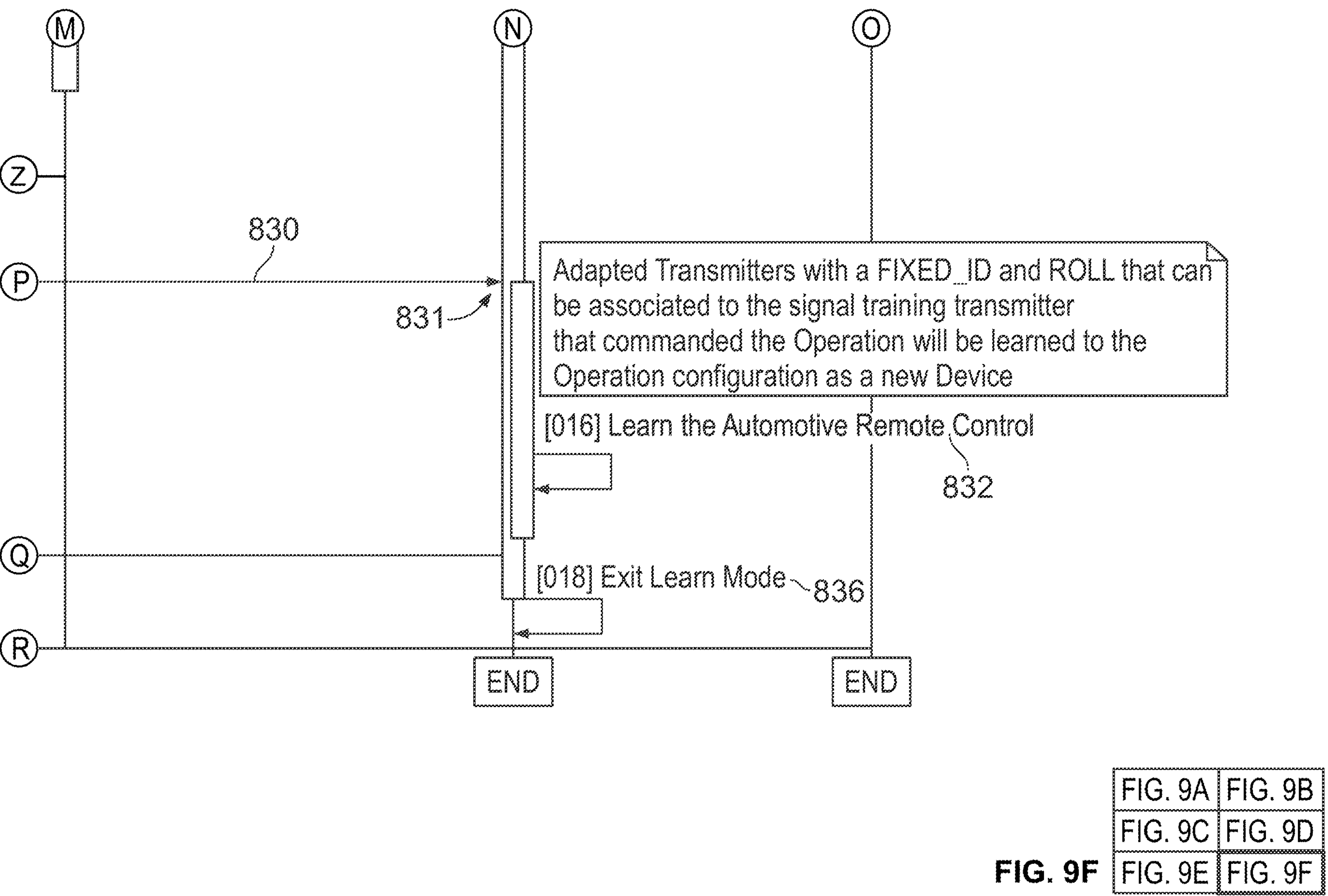

In one embodiment, the communication at 814 of FIG. 9D is a series of bidirectional communications of method 1000 discussed above in FIGS. 8A and 8B.

Turning to FIG. 9D, at 814, the remote control 200 communicates (e.g., using the first communication protocol) an access code that includes a fixed code and a changing code to the movable barrier operator 300 as discussed above with reference to FIGS. 8A and 8B. The movable barrier operator 300 stores in the memory 304 the fixed codes and the changing codes received from the remote control 200 from the bidirectional operation process. The movable barrier operator 300 decrypts the message(s) transmitted by the remote control 200 using the first communication protocol and performs 816 the action requested by the message(s) such as, but not limited to, moving a movable barrier, such as the garage door 24 from a first position to a second position, once the messages have been validated.

As explained above, when the remote control 200 communicates the access code at 814, the trainable transmitter 100 does not respond to the communications since the communication is made using the first communication protocol and the receiver 107 of the trainable transmitter 100 is listening for communications made using the second communication protocol.

In addition to performing the requested action at 816, at 818 the movable barrier operator 300 initiates a second communication protocol learn mode (i.e., a learn mode that is different and/or distinct from the learning/pairing mode that is facilitated by example method 700 shown in FIGS. 7A and 7B). In some examples, the second communication protocol learn mode is initiated upon movable barrier operator receiving the access code from the remote control 200, upon the movable barrier operator validating the request to perform the action, or upon the movable barrier operator 300 performing the request action. In another example, the second communication protocol learn mode is initiated in response to the movable barrier operator 300 receiving an authorized communication via the first communication protocol (e.g., from the remote control 200) and receiving a communication via the second communication protocol (e.g., from the remote control 200).

In the second communication protocol learn mode, the movable barrier operator 300 derives a second access code from the access code (e.g., the fixed code and most recent changing code) received from the remote control 200 from the communications at 814. The movable barrier operator 300 may derive the second access code by decrypting the communication from the operation at 814, parsing/identifying the fixed code and the most recent changing code) of the communication from the operation at 814, and deriving the second access code based using a derived version of the fixed code and/or a derived version of the most recent changing code using a predetermined mathematical relationship, such as appending or prepending values to the fixed code and calculating the modified version of the changing code based on the changing code from the remote control 200. The predetermined mathematical relationship in this procedure is programmed/stored in both the memory 304 of the trainable transmitter 100 and the memory 304 of the movable barrier operator 300 so that the trainable transmitter 100 may calculate the derived second access code from the communication at 820 (which uses the second communication protocol) and the movable barrier operator 300 may calculate the derived second access code from the communication at 814 (which used the first communication protocol). As such, if/when the movable barrier operator 300 subsequently receives a radio frequency communication transmitted by the trainable transmitter 100 via the second communication protocol, and this communication includes the derived second access code, the movable barrier operator 300 will learn the trainable transmitter 100.

In some examples, the deriving of the second access code at 818 includes the controller 302 of the movable barrier operator 300 deriving an expected fixed code from the fixed code from the communication at 814, such as by prepending or appending a value to the fixed code from the communication at 814. In some examples, the deriving also includes the controller 302 of the movable barrier operator 300 deriving an expected changing code from the changing code of communication at 814. For example, if the changing code received by the movable barrier operator 300 from the communication at 814 is a rolling code value, the derived changing code is the next rolling code incremented by the algorithm known to the trainable transmitter 100 and the movable barrier operator 300.

In some examples, although the communications at 814 are sent and received according to the first communication protocol, the movable barrier operator 300 begins listening for radio frequency communications using the second communication protocol at operation 818. In this manner, the receipt of an authorized command via one communication protocol (e.g., the first communication protocol) at 814 triggers a learning mode for the movable barrier operator 300 for a different communication protocol (second communication protocol) at 818.

With reference to FIGS. 9C and 9D, the controller 202 (see FIG. 3) of the remote control 200 measures a duration the user 50 provides the user input at 812, such as by measuring the duration of a button press on the user interface 201. At 821, once the controller 202 determines the user 50 has provided the user input for a predetermined period of time, such as, but not limited to, greater than ten seconds, at 820, the controller 202 of the remote control 200 controls the second transmitter 208 to send (e.g., transmit or broadcast) a radio frequency communication via the second communication protocol. The radio frequency communication at 820 includes the access code, for example, a fixed code 820A, a changing code 820B, and optionally a payload 820C, such as a set of parameters. The payload 820C may include, for example, a portion of a Wiegand credential, a switch value, open style value, close style value, and/or toggle style value.

With reference to FIG. 9D, the movable barrier operator 300 is in the second communication protocol learn mode before the movable barrier operator 300 receives the communication at 820 from the remote control 200 or, in some examples, as a result of the movable barrier operator 300 receiving the communications at 820 from the remote control 200. Although the movable barrier operator 300 is in the second communication protocol learn mode, the movable barrier operator 300 does not learn the remote control 200 as a second communication protocol device because the remote control 200 has already been learned by the movable barrier operator 300 as a first communication protocol device considering that the communication at 820 contains the same access code or substantially the same access code as the communications at 814 included and the access code is not the derived second access code. For example, the communication at 820 contains the access code, which includes, in some examples, the fixed code of the remote control 200 and the most recent changing code from the communications at 814. The communication at 820 from the remote control 200 therefore lacks the derived second access code expected by the movable barrier operator 300 while the movable barrier operator 300 is in the learning mode for the second communication protocol. As such, at 823, the movable barrier operator 300 ignores the communication at 820 from the remote control 200.

With reference to FIG. 9C, since the trainable transmitter 100 is in the training mode, the trainable transmitter 100 is listening for a radio frequency communication sent (e.g., transmitted or broadcast) via the second communication protocol. Thus, while the movable barrier operator 300 ignores the communication at 820 from the remote control 200, the trainable transmitter 100 is listening for such a communication and, as such, receives the communication from the operation at 820 being sent (e.g., transmitted or broadcast) from the remote control 200 using the second communication protocol and, at 825, decodes the communication from the operation at 820. In one example, the decoding at 825 includes identifying a frequency, a code format, a fixed code 825A such as a transmitter ID, changing code 825B, a payload 825C, and/or a switch ID.

In some examples, the decoding at 825 includes performance of the operations involved in setting up the trainable transmitter 100 to be able to control the movable barrier operator 300 based upon information received from the remote control 200 (from, for example, communication from the operation at 820). The decoding at 825 includes deriving, by the trainable transmitter 100, a derived second access code from the access code of the communication at 820. The deriving of the second access code includes the same deriving operations performed by the movable barrier operator 300 at operation 818. For example, the trainable transmitter 100 derives a second fixed code and a second changing code from the fixed code 820A and the changing code 820B of the communication at 820.

Once the trainable transmitter 100 has been programmed using information sent from the remote control 200 at 820, at 822, the trainable transmitter 100 provides an indication to the user 50, such as by flashing an LED, that the trainable transmitter 100 has been programmed. In some examples, at 824, the user 50 removes the user input (e.g., stops providing the user input) at the user interface 101 of the trainable transmitter 100, such as by releasing the button the user was holding down on the user interface 101 of the trainable transmitter 100. In some examples, at 826, the user 50 also removes the user input (e.g., stops providing the user input) at the user interface 201 of the remote control 200.

At 828 (e.g., after the trainable transmitter 100 has been learned/trained), the user 50 provides a user input to the trainable transmitter 100 to send a command signal to the movable barrier operator 300, such as by pressing a button on the user interface 101 that has now been trained to operate the movable barrier operator 300. At 830, the trainable transmitter 100 sends (e.g., transmits or broadcasts) a communication via the second communication protocol. The communication at 830 includes the adapted or derived second access code from the access code of the communication at 820. For example, the communication at 830 includes a fixed code 830A, a changing code 830B, and a payload 830C that correspond, respectively, to the fixed code 820A, changing code 820B, and the payload 820C.

At 831, the movable barrier operator 300 receives the communication from the trainable transmitter 100. In one example, if the movable barrier operator 300 is still in the second communication protocol learn mode initiated at operation 818, the movable barrier operator 300 learns 832 the trainable transmitter 100 because the communication 830 includes the derived second access code (e.g., the derived fixed code and the derived changing code) expected by the movable barrier operator 300. In one example, the derived second access code includes a transmitter ID (e.g., 00011) that includes a value (1) appended to the transmitter ID (0001) of the remote control 200 and a changing code calculated from the changing code of the remote control 200 from communication at 814. The movable barrier operator 300 adds the transmitter ID (00011) of the trainable transmitter 100 to a whitelist of authorized second communication protocol transmitters maintained by the movable barrier operator 300.

At 834, the movable barrier operator 300 indicates, such as by blinking an LED or flashing an operator light, that the trainable transmitter 100 has been learned. At 836, the movable barrier operator 300 exits the second communication protocol learn mode.

Figure 10:
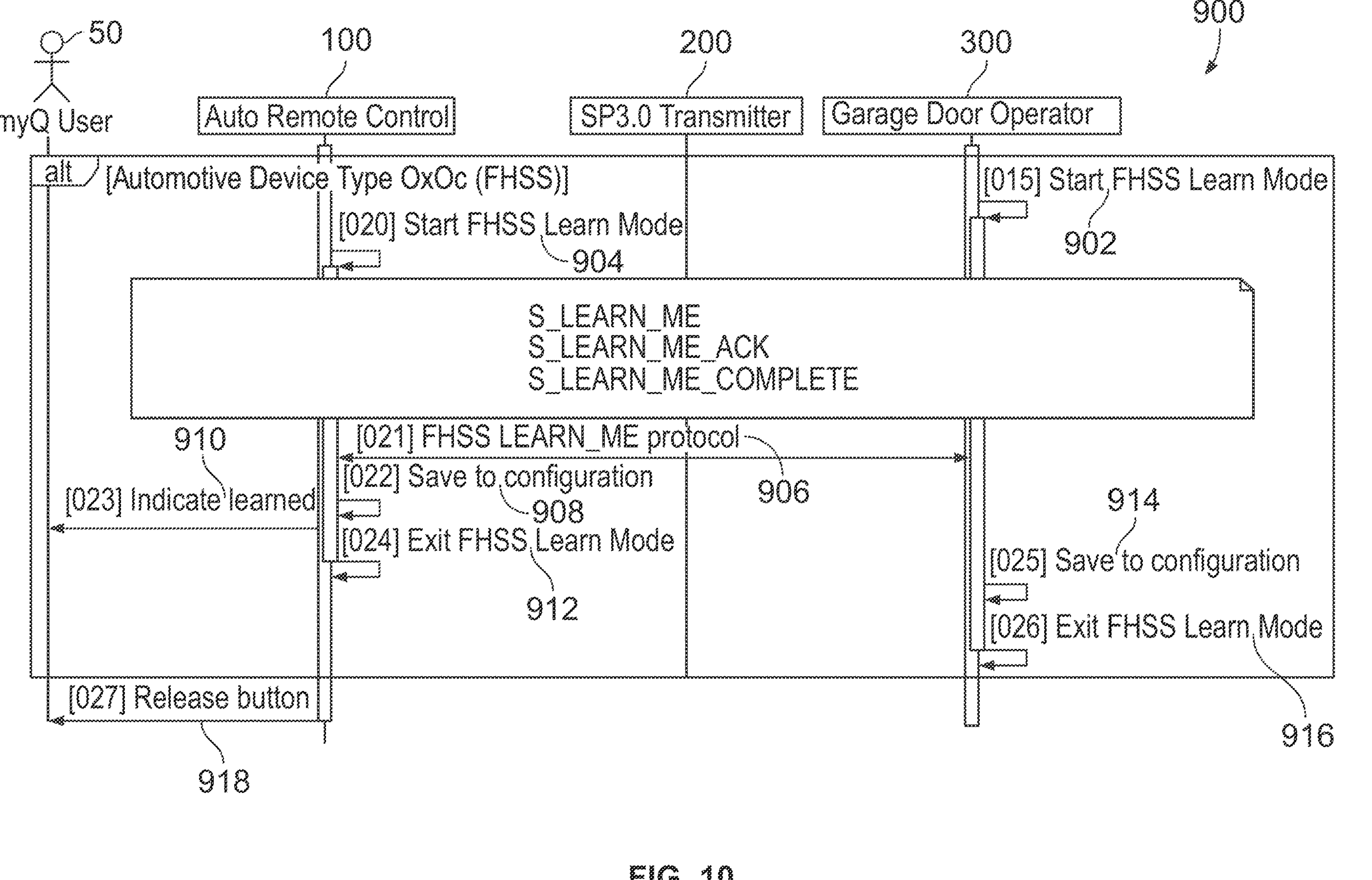
FIG. 10 is a flow diagram illustrating an optional method of pairing a trainable transmitter with a movable barrier operator that follows the method of FIGS. 9A-9F.

Regarding FIG. 10, a method 900 may be performed as part of the method 800 when the movable barrier operator 300 utilizes Frequency Hopping Spread Spectrum (FHSS). Specifically, the method 900 begins after the movable barrier operator 300 exits the second communication protocol learn mode at 836. At 902 and 904, the trainable transmitter 100 and the movable barrier operator 300 initiate the FHSS learn mode. At 906, the movable barrier operator 300 and the trainable transmitter 100 communicate information regarding a FHSS learn protocol. At 908 and 914, the trainable transmitter 100 and movable barrier operator 300 save the FHSS configuration data and, at 912 and 916 exit the FHSS learn mode. At 910, the trainable transmitter provides an indication that the FHSS configuration has been learned.

Regardless of whether the method 800 includes the method 900, at 918, the user 50 removes the user input (e.g., stops providing the user input) from the user interface 101 of the trainable transmitter 100. Once the movable barrier operator 300 has learned the trainable transmitter 100, the trainable transmitter 100 is used to control the movable barrier operator 300 pursuant to the method 400 discussed above with respect to FIG. 5.

Figure 11:
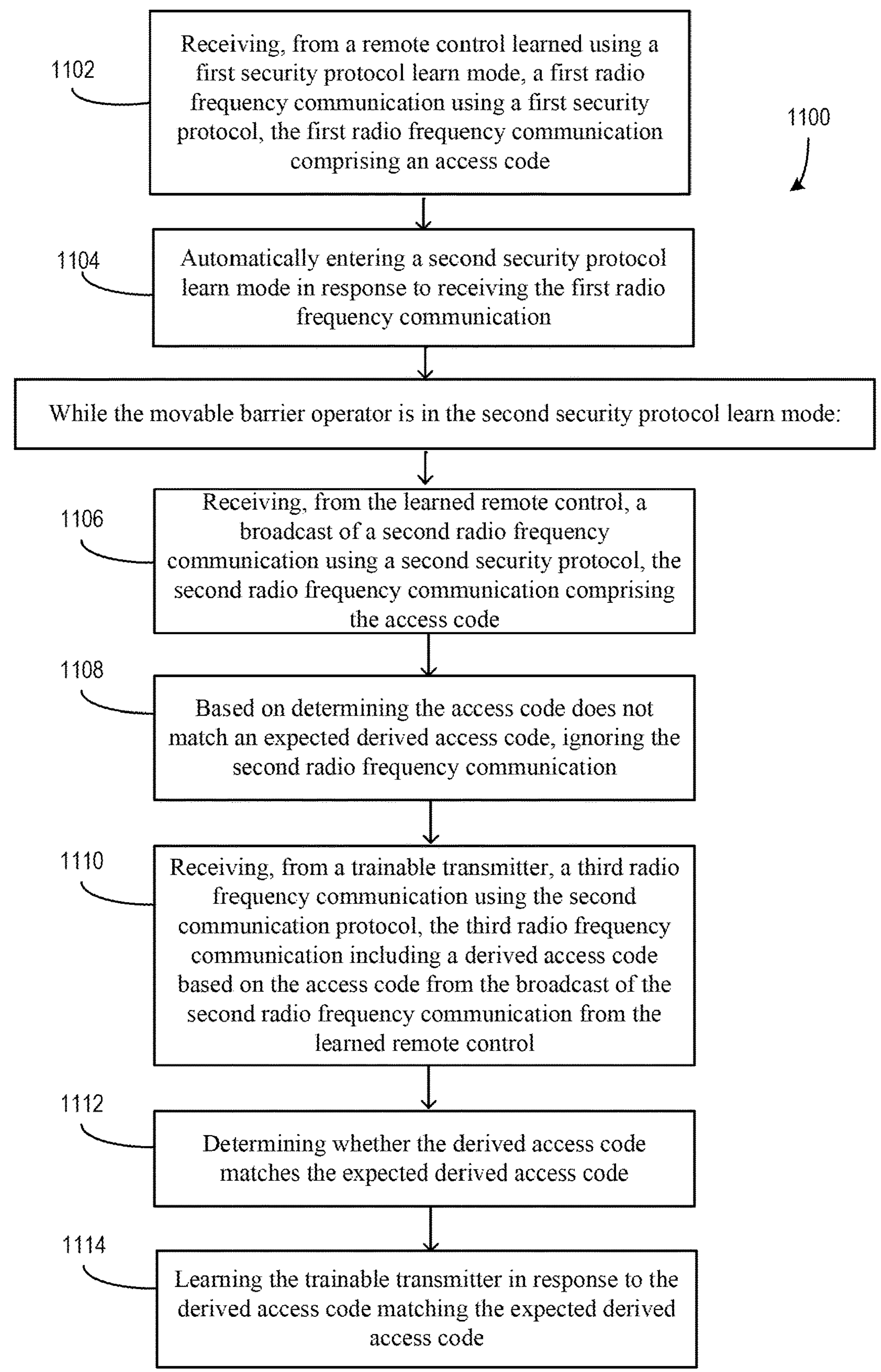
FIG. 11 is a flow diagram illustrating a method of operating a movable barrier operator to train a trainable transmitter.

FIG. 11 is an example flowchart illustrating a method 1100 of operating the movable barrier operator 300 to train the trainable transmitter 100 that cannot communicate with the movable barrier operator 300 using the first security protocol. The computer-implemented method 1100 of FIG. 11 is provided for illustration only and should not be construed as limiting. Other examples of the computer-implemented method 1100 can be used without departing from the scope of the present disclosure. In some examples, the computer-implemented method 1100 is implemented by the movable barrier operator 300.

The method 1100 begins at 1102 when the movable barrier operator 300 receives, from the remote control 200 (e.g., after the remote control 200 has been learned using the first security protocol learn mode), a first radio frequency communication using the first security protocol. In some examples, the first radio frequency communication comprises an access code. At 1104, the movable barrier operator 300 automatically enters the second security protocol learn mode in response to receiving the first radio frequency communication from the remote control 200. In some examples, the movable barrier operator 300 does not enter the second security protocol learn mode until the movable barrier operator 300 receives a communication from the remote control 200 using the second security protocol. In some examples, the first security protocol is a bidirectional wireless security protocol and the second security protocol is a unidirectional security protocol. At 1106, while the movable barrier operator 300 is in the second security protocol learn mode, a broadcast of a second radio frequency communication using a second security protocol is received from the learned remote control 200. In one example, the second radio frequency communication includes the access code. In one example, the movable barrier operator 300 derives an expected derived access code from the access code. In some examples, the access code comprises a fixed code and a changing code and the expected derived access includes a derivation of the fixed code and a derivation of the changing code. At 1108, while the movable barrier operator 300 is in the second security protocol learn mode, the movable barrier operator 300 ignores the second radio frequency communication based on determining the access code does not match an expected derived access code.

At 1110, while the movable barrier operator 300 is in the second security protocol learn mode, the movable barrier operator 300 receives, from the trainable transmitter 100, a third radio frequency communication using the second communication protocol. In some examples, the third radio frequency communication includes a derived access code based on the access code from the broadcast of the second radio frequency communication from the remote control 200. That is, in some examples, the expected derived access code and the derived access code from the trainable transmitter 100 are generated from the access code based on a same set of rules each of the trainable transmitter 100 and the movable barrier operator 300 have stored in memory. At 1112, while the movable barrier operator 300 is in the second security protocol learn mode, the movable barrier operator 300 determines whether the derived access code matches the expected derived access code. At 1114, while the movable barrier operator 300 is in the second security protocol learn mode, the movable barrier operator 300 learns the trainable transmitter 100 in response to the derived access code matching the expected derived access code. In some examples, after the movable barrier operator 300 learns the trainable transmitter 100, the movable barrier operator 300 receives, from the trainable transmitter 100, a fourth radio frequency communication using the second communication protocol. In some examples, the fourth radio frequency communication includes a request for the movable barrier operator 300 to move a movable barrier, such as the garage 24, and in response to receiving the request, the movable barrier operator 300 moves the movable barrier.

Figure 12:
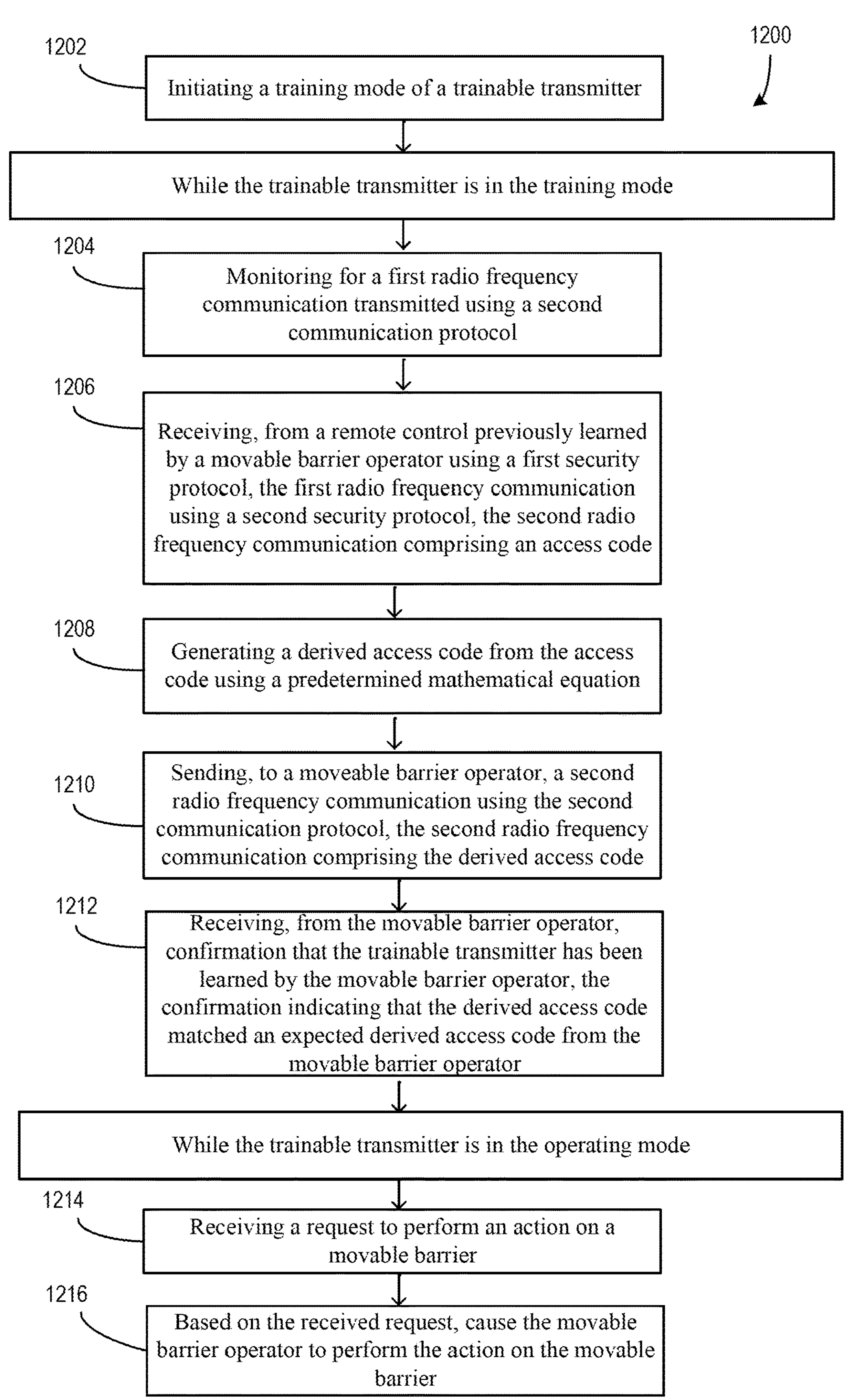
FIG. 12 is a flow diagram illustrating a method of operating a training transmitter during a training of the trainable transmitter.

FIG. 12 is an example flowchart illustrating a method 1200 of operating the trainable transmitter 100 during a training/learning of the trainable transmitter 100 without the trainable transmitter 100 being able to communicate using the first security protocol. The computer-implemented method 1200 of FIG. 12 is provided for illustration only and should not be construed as limiting. Other examples of the computer-implemented method 1200 can be used without departing from the scope of the present disclosure. In some examples, the computer-implemented method 1200 is implemented by the trainable transmitter 100.

The method 1200 begins at 1202 when a training mode of the trainable transmitter 100 is initiated. In one example, the initiation of the training mode is a result of the user 50 providing user input (e.g., pressing a button on the trainable transmitter) for a defined period of time. The following operations 1204-1212 are performed while the trainable transmitter 100 is in the training mode. At 1204, the trainable transmitter 100 monitors (e.g., listens) for a first radio frequency communication transmitted using the second communication protocol. For example, while other communications may be sent from other devices using the first communication protocol, the trainable transmitter 100 is configured to communicate using the second communication protocol and not the first communication protocol and thus, any communication sent using the first communication protocol is not received (e.g., not understood) by the trainable transmitter 100. At 1206, the trainable transmitter 100 receives, from the remote control 200 (which was previously learned by the movable barrier operator 300 using a first security protocol learn mode), the first radio frequency communication using a second security protocol. In one example, the second radio frequency communication comprises an access code. At 1208, the trainable transmitter 100 generates a derived access code from the access code using a predetermined mathematical equation. In one example, the predetermined mathematical equation is also known by the movable barrier operator 300. At 1210, the trainable transmitter 100 sends, to the moveable barrier operator 300, a second radio frequency communication using the second communication protocol. In one example, the second radio frequency communication comprises the derived access code. At 1212, the trainable transmitter 100 receives, from the movable barrier operator 300, confirmation that the trainable transmitter 100 has been learned by the movable barrier operator 300. At 1214, after the trainable transmitter has exited the learning mode and is now in operating mode, the trainable transmitter 100 receives a request (e.g., from the user 50) to perform an action on a movable barrier. At 1216, based on the received request, the trainable transmitter 100 causes the movable barrier operator 300 to perform the action on the movable barrier by, for example, sending the movable barrier operator 300 a communication (using the second communication protocol) that includes instructions or a request for the movable barrier operator 300 to execute the action, which is one of opening or closing the movable barrier.

Example Operating Environment

Figure 13:
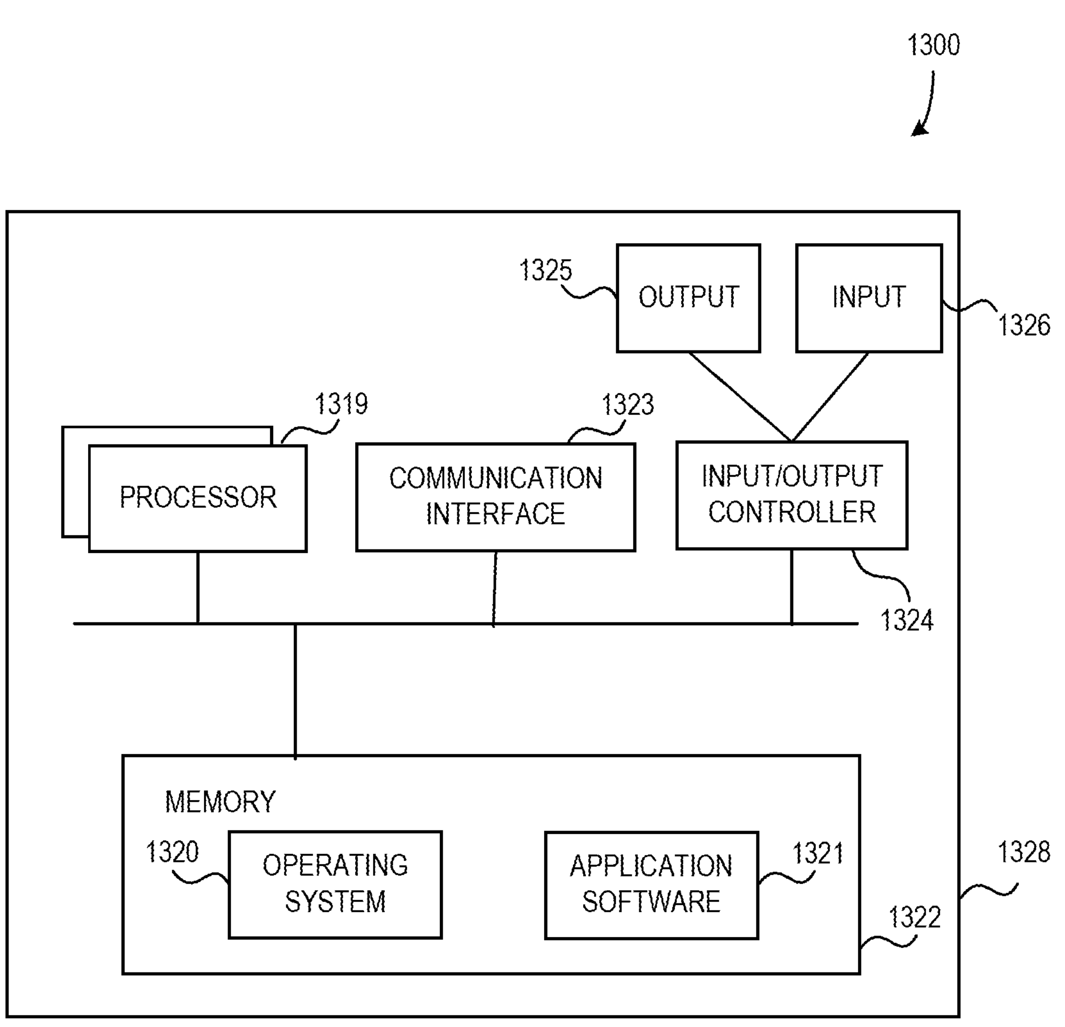
FIG. 13 is a block diagram of an example computing apparatus for implementing examples of the present disclosure.

The present disclosure is operable with a computing apparatus according to an example as a functional block diagram 1300 in FIG. 13. In an example, components of a computing apparatus 1328 may be implemented as a part of an electronic device according to one or more examples described in this specification. For example, the computing apparatus 1328 can be (or included in) the trainable transmitter 100, the remote control 200, or the movable barrier operator 300. The computing apparatus 1328 comprises one or more processors 1319 which may be microprocessors, controllers, or any other suitable type of processors for processing computer executable instructions to control the operation of the computing apparatus 1328. Alternatively, or in addition, the processor 1319 is any technology capable of executing logic or instructions, such as a hardcoded machine. Platform software comprising an operating system 1320, firmware, or any other suitable platform software may be provided on the computing apparatus 1328 to enable application software 1321 to be executed on the computing apparatus 1328.

Computer executable instructions may be provided using any computer-readable medium that is accessible by the computing apparatus 1328. Computer-readable media may include, for example, non-transitory computer storage media such as a memory 1322 and communications media. Computer storage media, such as a memory 1322, include volatile and non-volatile, removable, and non-removable media devices implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, quantum (state) memory, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 1322) is shown within the computing apparatus 1328, it will be appreciated by a person skilled in the art, that the storage may be distributed or located remotely and accessed via a network or other communication link (e.g., using a communication interface 1323).

In some examples, the computer-readable media includes instructions that, when executed by the processor 1319, execute instructions corresponding to respective operations in FIGS. 5-12.

The computing apparatus 1328 may comprise an input/output controller 1324 configured to output information to one or more output devices 1325, for example a display or a speaker, which may be separate from or integral to the electronic device. For example, the output device 1325 can be a user interface. The input/output controller 1324 may also be configured to receive and process an input from one or more input devices 1326, for example, a keyboard, a microphone, or a touchpad. In some examples, the one or more input devices 1326 is an input reception module. In one example, the output device 1325 may also act as the input device and vice-versa. An example of such a combination device that constitutes one or more of the output device 1325, the input device 1326 and the input/output controller 1324 may be a touch sensitive display. In some examples, a user may provide input to the input device(s) 1326 and/or receive output from the output device(s) 1325.

The functionality described herein can be performed, at least in part, by one or more hardware logic components. According to an example, the computing apparatus 1328 is configured by the program code when executed by the processor 1319 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASIC s), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with example computing apparatuses, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

In examples involving a general-purpose computer, aspects of the disclosure transform the general-purpose computer into a special-purpose computing device when configured to execute the instructions described herein.

An example computer-implemented method of operating a remote control to train a trainable transmitter includes receiving an input by the remote control; sending, to a controllable device, a first radio frequency communication via a first security protocol in response to receiving the input, the first radio frequency communication including a first fixed code and a first changing code; measuring, by the remote control, a duration of the input; and sending, to the controllable device and the trainable transmitter, a second radio frequency communication via a second security protocol different than the first security protocol in response to the measured duration of the input satisfying a duration threshold, the second radio frequency communication including the first fixed code and the first changing code.

An example method of effecting communications between a trainable transmitter and a movable barrier operator includes at the movable barrier operator: receiving, from a previously learned remote control, a first radio frequency communication via a first security protocol, the first radio frequency communication including a first fixed code and a first changing code; automatically entering a second security protocol learn mode in response to receiving the first radio frequency communication, wherein the movable barrier operator in the second security protocol learn mode is configured to receive a second radio frequency communication via a second security protocol different than the first security protocol; receiving, from a trainable transmitter, the second radio frequency communication while the movable barrier operator is in the second security protocol learn mode, the second radio frequency communication including a second fixed code and a second changing code; determining whether the second fixed code is derived from the first fixed code and whether the second changing code is derived from the first changing code; and learning the trainable transmitter in response to determining the second fixed code and the second changing code are derived from the first fixed code and the first changing code.

A method of effecting communications between a trainable transmitter and a movable barrier operator includes: at the movable barrier operator: receiving, from a remote control learned using a first security protocol learn mode, a first radio frequency communication using a first security protocol, the first radio frequency communication comprising an access code; automatically entering a second security protocol learn mode in response to receiving the first radio frequency communication; while the movable barrier operator is in the second security protocol learn mode: receiving, from the learned remote control, a broadcast of a second radio frequency communication using a second security protocol, the second radio frequency communication comprising the access code; based on determining the access code does not match an expected derived access code, ignoring the second radio frequency communication; receiving, from a trainable transmitter, a third radio frequency communication using the second communication protocol, the third radio frequency communication including a derived access code based on the access code from the broadcast of the second radio frequency communication from the learned remote control; determining whether the derived access code matches the expected derived access code; and learning the trainable transmitter in response to the derived access code matching the expected derived access code.

A method for training a trainable transmitter includes: initiating a training mode of a trainable transmitter; while the trainable transmitter is in the training mode, the trainable transmitter: monitoring for a first radio frequency communication transmitted using a second communication protocol; receiving, from a remote control previously learned by a movable barrier operator using a first communication protocol, the first radio frequency communication using the second communication protocol, the second radio frequency communication comprising an access code; generating a derived access code from the access code using a predetermined mathematical equation; sending, to a moveable barrier operator, a second radio frequency communication using the second communication protocol, the second radio frequency communication comprising the derived access code; and receiving, from the movable barrier operator, confirmation that the trainable transmitter has been learned by the movable barrier operator, the confirmation indicating that the derived access code matched an expected derived access code from the movable barrier operator; and while the learned trainable transmitter is in an operating mode, receiving a request to perform an action on a movable barrier; and based on the received request, cause the movable barrier operator to perform the action on the movable barrier.

A method of training a trainable transmitter includes: sending, from a remote control previously learned using a first security protocol, a first radio frequency communication via a first security protocol, the first radio frequency communication including a first fixed code and a first changing code; authenticating, by a controllable device, the remote control based at least in part upon the first fixed code, the first changing code, and a changing code of a previous radio frequency communication from the remote control; entering, by the controllable device, a second security protocol learn mode in response to authenticating the remote control; while the controllable device is in the second security protocol learn mode: sending, from the remote control, a second radio frequency communication via a second security protocol different than the first security protocol, the second radio frequency communication including the first fixed code and the first changing code; receiving, by the trainable transmitter, the second radio frequency communication; determining, by the trainable transmitter, at least one of a second fixed code and a second changing code based at least in part upon the first fixed code and the first changing code; sending, from the trainable transmitter, a third radio frequency communication via the second security protocol, the third radio frequency communication including the at least one of the second fixed code and the second changing code; and learning, by the controllable device, the trainable transmitter in response to the second fixed code corresponding to the first fixed code and the second changing code corresponding to the first changing code.

A system for training a trainable transmitter includes: the trainable transmitter, a remote control, a movable barrier operator, and a processor programmed to perform the following operations: receiving, from a remote control learned using a first security protocol learn mode, a first radio frequency communication using a first security protocol, the first radio frequency communication comprising an access code; causing the movable barrier operator to automatically enter a second security protocol learn mode in response to receiving the first radio frequency communication; while the movable barrier operator is in the second security protocol learn mode: receiving, from the learned remote control, a broadcast of a second radio frequency communication using a second security protocol, the second radio frequency communication comprising the access code; based on determining the access code does not match an expected derived access code, ignoring the second radio frequency communication; receiving, from a trainable transmitter, a third radio frequency communication using the second security protocol, the third radio frequency communication including a derived access code based on the access code from the broadcast of the second radio frequency communication from the learned remote control; determining whether the derived access code matches the expected derived access code; and learning the trainable transmitter in response to the derived access code matching the expected derived access code.

A system for training a trainable transmitter includes: the trainable transmitter, a remote control, a movable barrier operator, and a processor programmed to perform the following operations: initiating a training mode of a trainable transmitter; while the trainable transmitter is in the training mode, monitoring for a first radio frequency communication transmitted using a second communication protocol; receiving, from a remote control previously learned by a movable barrier operator using a first communication protocol, the first radio frequency communication using the communication protocol, the second radio frequency communication comprising an access code; generating a derived access code from the access code using a predetermined mathematical equation; sending, to a moveable barrier operator, a second radio frequency communication using the second communication protocol, the second radio frequency communication comprising the derived access code; and receiving, from the movable barrier operator, confirmation that the trainable transmitter has been learned by the movable barrier operator, the confirmation indicating that the derived access code matched an expected derived access code from the movable barrier operator; and while the learned trainable transmitter is in an operating mode, receiving a request to perform an action on a movable barrier; and based on the received request, cause the movable barrier operator to perform the action on the movable barrier.

A movable barrier operator configured to perform the following operations: receiving, from a remote control learned using a first security protocol learn mode, a first radio frequency communication using a first security protocol, the first radio frequency communication comprising an access code; causing the movable barrier operator to automatically enter a second security protocol learn mode in response to receiving the first radio frequency communication; while the movable barrier operator is in the second security protocol learn mode: receiving, from the learned remote control, a broadcast of a second radio frequency communication using a second security protocol, the second radio frequency communication comprising the access code; based on determining the access code does not match an expected derived access code, ignoring the second radio frequency communication; receiving, from a trainable transmitter, a third radio frequency communication using the second security protocol, the third radio frequency communication including a derived access code based on the access code from the broadcast of the second radio frequency communication from the learned remote control; determining whether the derived access code matches the expected derived access code; and learning the trainable transmitter in response to the derived access code matching the expected derived access code A trainable transmitter configured to perform the following operations: initiating a training mode; while the trainable transmitter is in the training mode, monitoring for a first radio frequency communication transmitted using a second communication protocol; receiving, from a remote control previously learned by a movable barrier operator using a first communication protocol, the first radio frequency communication using the second communication protocol, the second radio frequency communication comprising an access code; generating a derived access code from the access code using a predetermined mathematical equation; sending, to a moveable barrier operator, a second radio frequency communication using the second communication protocol, the second radio frequency communication comprising the derived access code; and receiving, from the movable barrier operator, confirmation that the trainable transmitter has been learned by the movable barrier operator, the confirmation indicating that the derived access code matched an expected derived access code from the movable barrier operator; and while the learned trainable transmitter is in an operating mode, receiving a request to perform an action on a movable barrier; and based on the received request, cause the movable barrier operator to perform the action on the movable barrier.

A remote control configured to perform the following operations: receiving an input; sending, to a controllable device, a first radio frequency communication via a first security protocol in response to receiving the input, the first radio frequency communication including a first fixed code and a first changing code; measuring, by the remote control, a duration of the input; and sending, to the controllable device and the trainable transmitter, a second radio frequency communication via a second security protocol different than the first security protocol in response to the measured duration of the input satisfying a duration threshold, the second radio frequency communication including the first fixed code and the first changing code.

A system for training a trainable transmitter includes: the trainable transmitter, a remote control previously learned using a first security protocol learn mode, and a movable barrier operator; the remote control sends a first radio frequency communication via a first security protocol, the first radio frequency communication including a first fixed code and a first changing code; the movable barrier operator authenticates the remote control based at least in part upon the first fixed code, the first changing code, and a changing code of a previous radio frequency communication from the remote control; and enters a second security protocol learn mode in response to authenticating the remote control; while the controllable device is in the second security protocol learn mode: the remote control sends a second radio frequency communication via a second security protocol different than the first security protocol, the second radio frequency communication including the first fixed code and the first changing code; the trainable transmitter: receives the second radio frequency communication; determines at least one of a second fixed code and a second changing code based at least in part upon the first fixed code and the first changing code; and sends a third radio frequency communication via the second security protocol, the third radio frequency communication including the at least one of the second fixed code and the second changing code; and the movable barrier operator learns the trainable transmitter in response to the second fixed code corresponding to the first fixed code and the second changing code corresponding to the first changing code.

Alternatively, or in addition to the other examples described herein, examples include any combination of the following:

- wherein the controllable device is configured to ignore the second radio frequency communication;
- wherein receiving the input comprises receiving a single user input at a user interface of the remote control;
- wherein the duration threshold comprises a duration of the user input reaching a predetermined time value;
- wherein the predetermined time value is at least ten seconds;
- wherein the controllable device includes a movable barrier operator;
- wherein the first radio frequency communication is configured to cause the movable barrier operator to move a barrier; and
- wherein the second radio frequency communication is unable to cause the movable barrier operator to move the barrier based on the second radio frequency communication not including a derived access code;
- wherein sending the first radio frequency communication comprises broadcasting the first radio frequency communication at a frequency higher than 2 GHz; and wherein sending the second radio frequency communication comprises broadcasting the second radio frequency communication at a frequency lower than 1 GHz;
- receiving, from the controllable device, a response radio frequency communication via the first security protocol, the response radio frequency communication including a controllable device fixed code and a controllable device changing code;
- authenticating the controllable device based at least in part upon the controllable device fixed code, the controllable device changing code, a fixed code from a previous operation of the controllable device, and a changing code from the previous operation of the controllable device; and sending, to the controllable device, a reply radio frequency communication via the first security protocol, the reply radio frequency communication including the first fixed code and a changed version of the first changing code;

wherein the first security protocol is a bidirectional wireless security protocol; and wherein the second security protocol is a unidirectional security protocol;

determining the first changing code based at least in part upon a changing code previously transmitted to the controllable device to operate the controllable device;

wherein measuring the duration of the user input includes counting a quantity of broadcasts;

wherein receiving, from the previously learned remote control, the first radio frequency communication comprises receiving the first radio frequency communication at a frequency higher than 2 GHz; and wherein receiving, from the trainable transmitter, the second radio frequency communication comprises receiving the second radio frequency communication at a frequency lower than 1 GHz;

determining whether the movable barrier operator has learned a maximum number of remote controls; and wherein learning the trainable transmitter comprises learning the trainable transmitter in response to:

determining the second fixed code is derived from the first fixed code;

determining the second changing code is derived from the first changing code; and determining the movable barrier operator has not learned the maximum number of remote controls;

moving a movable barrier in response to receiving, from the remote control, the first radio frequency communication;

while the movable barrier operator is in the second security protocol learn mode:

receiving, from the remote control, a third radio frequency communication via the second security protocol, the third radio frequency communication including the first fixed code and a changed version of the first changing code; and based on the third radio frequency communication not including the second fixed code and the second changing code derived from the first fixed code and the first changing code, ignoring the third radio frequency communication and not moving the movable barrier;

wherein automatically entering the second security protocol learn mode includes opening a time window to receive the second radio frequency communication;

after learning the trainable transmitter, at the movable barrier operator:

exiting the second security protocol learn mode after a predetermined time period;

receiving, from the trainable transmitter, a third radio frequency communication via the second security protocol;

authenticating the third radio frequency communication; and moving a movable barrier in response to authenticating the third radio frequency communication;

wherein the second fixed code is different than the first fixed code and the second changing code is different than the first changing code;

after learning the trainable transmitter:

receiving, from the learned trainable transmitter, a fourth radio frequency communication using the second communication protocol, the fourth radio frequency communication comprising a request for the movable barrier operator to move a movable barrier; and in response to receiving the request, moving the movable barrier;

determining, from the access code, the expected derived access code;

wherein the access code comprises a fixed code and a changing code;

wherein the expected derived access comprises a derivation of the fixed code and a derivation of the changing code;

wherein the expected derived access code and the derived access code from the trainable transmitter are generated from the access code based on a same set of rules;

wherein a predetermined mathematical equation is used by the trainable transmitter to generate the derived access code from the access code; and wherein the predetermined mathematical equation is used by the movable barrier operator to generate the expected derived access code from the access code;

wherein the action is one of the following: opening the movable barrier or closing the movable barrier;

wherein sending the first radio frequency communication comprises broadcasting the first radio frequency communication in response to receiving a first user input at a user interface of the remote control, the first user input being received for a period of time less than a predetermined period of time; and wherein sending the second radio frequency communication comprises broadcasting the second radio frequency communication in response to receiving a second user input at the user interface of the remote control, the second user input being received for a period of time equal to or greater than the predetermined period of time;

wherein sending the first radio frequency communication comprises broadcasting the first radio frequency communication in response to receiving a user input at the user interface of the remote control; and wherein sending the second radio frequency communication comprises broadcasting the second radio frequency communication in response to the user input satisfying a user input condition;

determining, by the remote control, a satisfaction of the user input condition in response to the user interface receiving the user input for a predetermined period of time;

detecting, by the remote control, a button press of the remote control;

determining, by the remote control, a duration of the button press;

wherein sending the first radio frequency communication comprises broadcasting the first radio frequency communication in response to detecting the button press; and wherein sending the second radio frequency communication comprises broadcasting the second radio frequency communication in response to the duration of the button press satisfying a button press condition;

wherein the controllable device has the first security protocol learn mode, wherein the controllable device is configured to learn other remote controls that transmit radio frequency communications via the first security protocol; and wherein learning the trainable transmitter comprises the controllable device learning the trainable transmitter while the controllable device is operating in the second security protocol learn mode;

wherein sending the first radio frequency communication comprises broadcasting the first radio frequency communication at a frequency higher than 2 GHz; and wherein sending the second radio frequency communication comprises broadcasting the second radio frequency communication at a frequency lower than 1 GHz;

wherein the first security protocol specifies a first code format; and wherein the second security protocol specifies a second code format different than the first code format;

wherein sending, from the remote control, the second radio frequency communication causes the controllable device to ignore the second radio frequency communication from the remote control based at least on the second radio frequency communication not including a derived access code;

sending, from the controllable device, a fourth radio frequency communication via the first security protocol, the fourth radio frequency communication including a controllable device fixed code and a controllable device changing code;

receiving, by the remote control, the fourth radio frequency communication;

sending, from the remote control, a fifth radio frequency communication via the first security protocol, the fifth radio frequency communication including the first fixed code and a changed version of the first changing code;

authenticating, by the remote control, the controllable device based at least in part upon the controllable device fixed code, the controllable device changing code, a previously received controllable device fixed code, and a previously received controllable device changing code; and sending, from the remote control, a sixth radio frequency communication via the first security protocol, the sixth radio frequency communication including the first fixed code and a modified version of the controllable device changing code;

wherein the trainable transmitter is unable to communicate using the first security protocol;

at the trainable transmitter:

receiving a user input at a user interface of the trainable transmitter; and entering a learning mode in response to receiving the user input and prior to receiving the second radio frequency communication;

wherein determining, by the trainable transmitter, the second fixed code and the second changing code comprises decrypting the second radio frequency communication; and wherein learning the trainable transmitter comprises:

receiving, by the controllable device, the third radio frequency communication;

decrypting, by the controllable device, the third radio frequency communication; and determining, by the controllable device, the second fixed code and the second changing code correspond to the first fixed code and the first changing code based at least in part upon a mathematical relationship between the first fixed code, first changing code, the second fixed code, and the second changing code;

wherein the controllable device comprises a movable barrier operator, the method further comprising:

receiving, by the movable barrier operator, the first radio frequency communication; and moving, by the movable barrier operator, a movable barrier between an open position and a closed position in response to the movable barrier operator receiving the first radio frequency communication;

receiving, by the movable barrier operator, the second radio frequency communication; and determining, by the movable barrier operator, that the second radio frequency communication does not include a derived access code, and based on the determining, ignoring, by the movable barrier operator, the second radio frequency communication such that the movable barrier operator does not move the movable barrier in response to receiving the second radio frequency communication;

wherein the controllable device enters the second security protocol learn mode when the controllable device receives the first and second radio frequency communications from the remote control;

determining, by the controllable device, a third fixed code based upon the first fixed code;

determining, by the controllable device, a third changing code based upon the first changing code; and wherein learning, by the controllable device, the trainable transmitter comprises the controllable device learning the trainable transmitter in response to the second fixed code matching the third fixed code and the second changing code matching the third changing code;

wherein the second fixed code is different than the first fixed code and the second changing code is different than the first changing code;

wherein learning the trainable transmitter comprises at least one of:

determining, by the controllable device, the second fixed code corresponds to the first fixed code in response to the second fixed code having a first predetermined mathematical relationship with the first fixed code; and determining, by the controllable device, the second changing code corresponds to the first changing code in response to the second changing code having a second predetermined mathematical relationship with the first fixed code;

wherein the second fixed code comprises the first fixed code with a value prepended or appended to the first fixed code;

wherein authenticating the remote control is based at least in part upon:

the first fixed code;

the first changing code;

the changing code of the previous radio frequency communication from the remote control;

the second fixed code; and the second changing code.

All references, including publications, patent applications, and patents cited herein are hereby incorporated by reference to the same extent as if each reference were individually and specifically indicated to be incorporated by reference and were set forth in its entirety herein.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method comprising:

initiating a training mode of a trainable transmitter;

while the trainable transmitter is in the training mode, the trainable transmitter:

monitoring for a first radio frequency communication transmitted using a second communication protocol;

receiving, from a remote control previously learned by a movable barrier operator using a first communication protocol, the first radio frequency communication using the second communication protocol, the first radio frequency communication comprising an access code;

generating a derived access code from the access code using a predetermined mathematical equation;

sending, to a moveable barrier operator, a second radio frequency communication using the second communication protocol, the second radio frequency communication comprising the derived access code; and receiving, from the movable barrier operator, confirmation that the trainable transmitter has been learned by the movable barrier operator, the confirmation indicating that the derived access code matched an expected derived access code from the movable barrier operator; and while the learned trainable transmitter is in an operating mode, receiving a request to perform an action on a movable barrier; and based on the received request, cause the movable barrier operator to perform the action on the movable barrier.

2. The method of claim 1, wherein a predetermined mathematical equation is used by the trainable transmitter to generate the derived access code from the access code; and wherein the predetermined mathematical equation is used by the movable barrier operator to generate the expected derived access code from the access code.

3. The method of claim 1, wherein the action is one of the following: opening the movable barrier or closing the movable barrier.

4. The method of claim 1, wherein the first communication protocol is a bidirectional wireless security protocol; and wherein the second communication protocol is a unidirectional security protocol.

5. The method of claim 1, wherein the access code comprises a fixed code and a changing code.

6. The method of claim 5, wherein the expected derived access comprises a derivation of the fixed code and a derivation of the changing code.

7. The method of claim 1, wherein the expected derived access code from the movable barrier operator and the derived access code from the trainable transmitter are generated from the access code based on a same set of rules.

8. A trainable transmitter comprising a processor programmed to perform the following operations:

initiating a training mode of the trainable transmitter;

while the trainable transmitter is in the training mode, the processor further programmed to perform the following operations:

monitoring for a first radio frequency communication transmitted using a second communication protocol;

receiving, from a remote control previously learned by a movable barrier operator using a first communication protocol, the first radio frequency communication using the second communication protocol, the first radio frequency communication comprising an access code;

generating a derived access code from the access code using a predetermined mathematical equation;

sending, to a moveable barrier operator, a second radio frequency communication using the second communication protocol, the second radio frequency communication comprising the derived access code; and receiving, from the movable barrier operator, confirmation that the trainable transmitter has been learned by the movable barrier operator, the confirmation indicating that the derived access code matched an expected derived access code from the movable barrier operator; and while the learned trainable transmitter is in an operating mode, the processor is further programmed to perform the following operations:

receiving a request to perform an action on a movable barrier; and based on the received request, cause the movable barrier operator to perform the action on the movable barrier.

9. The trainable transmitter of claim 8, wherein a predetermined mathematical equation is used by the processor to generate the derived access code from the access code; and wherein the predetermined mathematical equation is used by the movable barrier operator to generate the expected derived access code from the access code.

10. The trainable transmitter of claim 8, wherein the action is one of the following: opening the movable barrier or closing the movable barrier.

11. The trainable transmitter of claim 8, wherein the first communication protocol is a bidirectional wireless security protocol; and wherein the second communication protocol is a unidirectional security protocol.

12. The trainable transmitter of claim 8, wherein the access code comprises a fixed code and a changing code.

13. The trainable transmitter of claim 12, wherein the expected derived access comprises a derivation of the fixed code and a derivation of the changing code.

14. The trainable transmitter of claim 8, wherein the expected derived access code from the movable barrier operator and the derived access code from the trainable transmitter are generated from the access code based on a same set of rules.

15. One or more non-transitory computer-readable media comprising computer-executable instructions that, when executed by a processor, cause the processor to perform the following operations:

initiating a training mode of a trainable transmitter;

while the trainable transmitter is in the training mode:

monitoring for a first radio frequency communication transmitted using a second communication protocol;

receiving, from a remote control previously learned by a movable barrier operator using a first security protocol learn mode, the first radio frequency communication using the second communication protocol, the first radio frequency communication comprising an access code;

generating a derived access code from the access code using a predetermined mathematical equation;

sending, to a moveable barrier operator, a second radio frequency communication using the second communication protocol, the second radio frequency communication comprising the derived access code; and receiving, from the movable barrier operator, confirmation that the trainable transmitter has been learned by the movable barrier operator, the confirmation indicating that the derived access code matched an expected derived access code from the movable barrier operator; and while the learned trainable transmitter is in an operating mode:

receiving a request to perform an action on a movable barrier; and based on the received request, cause the movable barrier operator to perform the action on the movable barrier.

16. The one or more non-transitory computer-readable media of claim 15, wherein a predetermined mathematical equation is used by the trainable transmitter to generate the derived access code from the access code; and wherein the predetermined mathematical equation is used by the movable barrier operator to generate the expected derived access code from the access code.

17. The one or more non-transitory computer-readable media of claim 15, wherein the action is one of the following: opening the movable barrier or closing the movable barrier.

18. The one or more non-transitory computer-readable media of claim 15, wherein the first security protocol learn mode uses a bidirectional wireless security protocol; and wherein the second communication protocol is a unidirectional security protocol.

19. The one or more non-transitory computer-readable media of claim 15, wherein the access code comprises a fixed code and a changing code.

20. The one or more non-transitory computer-readable media of claim 19, wherein the expected derived access comprises a derivation of the fixed code and a derivation of the changing code.

* * * * *